United States Patent
Rosenmayer

(10) Patent No.: US 11,773,240 B2
(45) Date of Patent: Oct. 3, 2023

(54) MOLECULAR COMPOSITES OF FUNCTIONAL SILICA AND NATURAL RUBBER

(71) Applicant: Silpara Technologies LLC, Decatur, GA (US)

(72) Inventor: Charles Thomas Rosenmayer, Decatur, GA (US)

(73) Assignee: Silpara Technologies LLC, Decatur, GA (US)

( * ) Notice: Subject to any disclaimer, the term of this patent is extended or adjusted under 35 U.S.C. 154(b) by 347 days.

(21) Appl. No.: 17/038,688

(22) Filed: Sep. 30, 2020

(65) Prior Publication Data

US 2021/0102046 A1    Apr. 8, 2021

Related U.S. Application Data

(60) Provisional application No. 63/033,204, filed on Jun. 1, 2020, provisional application No. 62/911,361, filed on Oct. 6, 2019.

(51) Int. Cl.

| | |
|---|---|
| C08L 7/02 | (2006.01) |
| C08G 77/20 | (2006.01) |
| C08G 77/26 | (2006.01) |
| C08K 3/36 | (2006.01) |
| C08K 9/02 | (2006.01) |
| C08K 5/09 | (2006.01) |
| C08K 5/07 | (2006.01) |
| C08K 5/053 | (2006.01) |
| B60C 1/00 | (2006.01) |

(52) U.S. Cl.
CPC .............. *C08L 7/02* (2013.01); *B60C 1/0016* (2013.01); *C08G 77/20* (2013.01); *C08G 77/26* (2013.01); *C08K 3/36* (2013.01); *C08K 5/053* (2013.01); *C08K 5/07* (2013.01); *C08K 5/09* (2013.01); *C08K 9/02* (2013.01); *C08L 2205/08* (2013.01)

(58) Field of Classification Search
CPC ........... C08L 7/02; C08G 77/20; C08G 77/26; C08K 3/36; C08K 9/02; C08K 5/09; C08K 5/07; C08K 5/053; B60C 1/00
USPC ....................................................... 523/157
See application file for complete search history.

(56) References Cited

U.S. PATENT DOCUMENTS

| | | | |
|---|---|---|---|
| 3,554,952 | A | 1/1971 | Plueddemann |
| 5,629,400 | A | 5/1997 | Standke et al. |
| 5,679,147 | A | 10/1997 | Standke et al. |
| 6,841,606 | B2 | 1/2005 | Yanagisawa et al. |
| 6,852,794 | B2 | 2/2005 | Puhala et al. |
| 7,101,922 | B2 | 9/2006 | Chen et al. |
| 7,276,550 | B2 | 10/2007 | Colvin et al. |
| 7,473,724 | B2 | 1/2009 | Hsu et al. |
| 7,799,870 | B2 | 9/2010 | Hergenrother et al. |
| 7,915,368 | B2 | 3/2011 | Hergenrother et al. |
| 8,097,674 | B2 | 1/2012 | Hergenrother et al. |
| 8,288,474 | B2 | 10/2012 | Hergenrother et al. |
| 8,293,827 | B2 | 10/2012 | Matsuda et al. |
| 8,501,895 | B2 | 8/2013 | Hergenrother et al. |
| 8,716,366 | B2 | 5/2014 | Alex et al. |
| 8,791,177 | B2 | 7/2014 | Morris et al. |
| 8,815,998 | B2 | 8/2014 | Matsui |
| 8,822,620 | B2 | 9/2014 | Hergenrother et al. |
| 8,865,799 | B2 | 10/2014 | Wallen et al. |
| 8,962,746 | B2 | 2/2015 | Hergenrother et al. |
| 9,068,060 | B2 | 6/2015 | Matsuura |
| 9,115,258 | B2 | 8/2015 | De Gaudemaris et al. |
| 9,132,697 | B2 | 9/2015 | Kondo |
| 9,145,489 | B2 | 9/2015 | Bibette et al. |
| 9,175,144 | B2 | 11/2015 | Berriot et al. |
| 9,238,720 | B2 | 1/2016 | Ueno et al. |
| 9,260,600 | B2 | 2/2016 | Takeda |

(Continued)

FOREIGN PATENT DOCUMENTS

| | | | | |
|---|---|---|---|---|
| CN | 105358612 | A | * 2/2016 | ........... B60C 1/0016 |
| JP | 5333723 | B2 | 11/2013 | |

(Continued)

OTHER PUBLICATIONS

Gelest Silane Coupling Agents Connecting Across Boundaries, 3rd Edition by Barry Arkles. Copyright 2014 (Year: 2014).*

(Continued)

*Primary Examiner* — Deve V Hall

(74) *Attorney, Agent, or Firm* — Morris, Manning & Martin, LLP; Daniel E. Sineway, Esq.; Micah B. Hensley, Esq.

(57) ABSTRACT

Briefly described, and according to one embodiment, aspects of the present disclosure generally relate to natural rubber and functional silica compositions for tire manufacturing and methods for forming the same. In at least one embodiment, the disclosed composition is a renewable elastomeric polymeric composition for rubber compounding applications, such as low rolling resistance tire tread and winter tire tread applications. The disclosed composition may also reduce fuel consumption and, thus, carbon dioxide emissions in gas-powered vehicles, and increase driving range in electric vehicles, because the disclosed composition is more energy efficient than current tire material compositions. In various embodiments, the disclosed composition may be formed by blending water-soluble silsesquioxane oligomers into a natural rubber latex system, followed by in-situ formation of a continuous, molecular silica network within the resulting polymer.

14 Claims, 8 Drawing Sheets

(56) References Cited

U.S. PATENT DOCUMENTS

| | | |
|---|---|---|
| 9,267,019 B2 | 2/2016 | Arigo et al. |
| 9,284,420 B2 | 3/2016 | De Gaudemaris et al. |
| 9,290,626 B2 | 3/2016 | De Gaudemaris et al. |
| 9,290,627 B2 | 3/2016 | De Gaudemaris et al. |
| 9,403,969 B2 | 8/2016 | Hergenrother et al. |
| 9,447,244 B2 | 9/2016 | Hergenrother et al. |
| 9,505,890 B2 | 11/2016 | De Gaudemaris et al. |
| 9,637,601 B2 | 5/2017 | Bibette et al. |
| 9,637,610 B2 | 5/2017 | Ngeow et al. |
| 10,000,612 B2 | 6/2018 | Xiong et al. |
| 10,030,124 B2 | 7/2018 | Colvin et al. |
| 10,494,510 B2 | 12/2019 | Hatano et al. |
| 2007/0287774 A1 | 12/2007 | Crutchley |
| 2009/0165913 A1 | 7/2009 | Hergenrother et al. |
| 2010/0132863 A1 | 6/2010 | Miki et al. |
| 2012/0077922 A1 | 3/2012 | Hergenrother et al. |
| 2012/0259035 A1 | 10/2012 | Berriot et al. |
| 2012/0264849 A1 | 10/2012 | Berriot et al. |
| 2014/0296378 A1 | 10/2014 | De Gaudemaris et al. |
| 2016/0289423 A1 | 10/2016 | Ngeow et al. |
| 2017/0121511 A1 | 5/2017 | Li et al. |
| 2018/0201753 A1 | 7/2018 | Xiong et al. |
| 2018/0327572 A1 | 11/2018 | Maekawa |
| 2019/0270866 A1 | 9/2019 | Tadiello et al. |

FOREIGN PATENT DOCUMENTS

| | | |
|---|---|---|
| JP | 2017114975 A | 6/2017 |
| WO | 2006027618 A1 | 3/2006 |
| WO | 2016109625 A1 | 7/2016 |
| WO | 2016115132 A1 | 7/2016 |

OTHER PUBLICATIONS

European Search Report issued in EP Application No. 20199466.2, dated Feb. 9, 2021.

Chen, Ying; Peng, Zheng; Kong Ling Xue; Huant, Mao Fang; and Li, Pu Wang. "Natural Rubber Nanocomposite Reinforced With Nano Silica." Polymer Engineering and Science 2008, pp. 1674-1677.

Danilowicz, Paul A. and Bezilla, Jr., Bernard M. "Improved Performance in High Natural Rubber Silica Compounds." Presented at ITEC Cleveland, OH Sep. 18-20, 2012.

Saramolee, P.; Sahakaro, K.; Lopattananon, N.; Dierkes, W.K.; and Noordermeer, J.W.M. "Compatibilisation of Silica-filled Natural Rubber Compounds by Functionalised Low Molecular Weight Polymer".

Sarkawi, S. Salina; Dierkes, Wilma K.; and Noorder-meer, Jacques W.M. "Natural Rubber-Silica Combinations for Low Rolling Resistance Truck Tire Treads." Rubber World, Nov. 2012, pp. 26-31.

Sattayanurak, S.; Noordermeer, J.W.M.; Dierkes, W.K.; and Blue, A. "Silica-Reinforced Natural Rubber: Synergistic Effects by Addition of Small Amounts of Secondary Fillers to Silica-Reinforced Natural Rubber Tire Tread Compounds," Advances in Materials Science and Engineering, vol. 2019, Article ID 5891051, 8 pages, https:doi.org/10.1155/2019/5891051.

Sultani, Ali.K.; Al-Nesrawy, Sameer H.; and Al-Maamori, M.H. "Reinforcement Effect of Nano Silica on some Mechanical Properties of Side wall Tire Batch." International Journal of ChemTech Research. Coden (USA): IJCRGG, ISSN: 0974-4290, ISSN(Online):2455-9555 vol. 10 No. 9, pp. 701-710, 2017.

Zaeimoedin, Teku Zakwan; Che Aziz, Ahmad Kifli; and Kamal, Mazlina Mustafa, "Improving Filler Dispersion and Physical Properties of Epoxidised Natural Rubber/Silica Compound by Using Dual Fillers and Coupling Agent in Mixing Process." The Malaysian Journal of Analytical Sciences, vol. 18 No. 3 (2014): 604-611.

DOE/EERE Report DE-EE0006794 1 Advanced Truck and Bus Radial Materials for Fuel Efficiency.

Lingzhu Zhao, Junhui Lia, Zhijun Lia, Yucang Zhanga, Shuangquan Liaoa, Rentong Yua,?, David Huib,?? "Morphology and thermomechanical properties of natural rubber vulcanizates containing octavinyl polyhedral oligomeric silsesquioxane." Composites Part B 139 (2018) 40-46.

Peng, Zheng; Xue Kong, Ling; Li, Si-Dong; Chen, Yin; and Huang, Mao Fang. "Self-assembled natural rubber/silica nanocomposites: Its preparation and characterization." Composites Science and Technology 67 (2007) 3130-3139.

\* cited by examiner

MOLECULAR COMPOSITES OF FUNCTIONAL SILICA AND NATURAL RUBBER

CROSS REFERENCE TO RELATED APPLICATIONS

This application claims the benefit of, and priority to, U.S. Provisional Patent Application. No. 62/911,361, filed on Oct. 6, 2019, and entitled "Molecular Composites Comprising Functional Silica and Natural Rubber," and U.S. Provisional Patent Application. No. 63/033,204, filed on Jun. 1, 2020, and entitled "MOLECULAR COMPOSITES OF SILICA AND NATURAL RUBBER," the disclosures of which are incorporated by reference herein in their entireties.

TECHNICAL FIELD

The present disclosure relates generally to rubber composites and methods of making the same, and more particularly to compositions comprising natural rubber and aminoalkylsilsesquioxane polymer, as well as methods for making the same, and with particular relevance to the tire-manufacturing industry.

BACKGROUND

Tire manufacturers have been attempting to create a low-rolling resistance tire (LLR) as part of a sustainability trend within the industry. "Rolling resistance" is generally defined as the energy loss that occurs in every revolution of a tire due to the internal friction within the compound microstructure of the tire. A major source of the internal friction is in the weak interaction between the polymer and the typical carbon black filler material. The amount of energy lost to tire rolling resistance is significant. The department of energy (DOE) estimates that, on average, 33% of the energy delivered to vehicle wheels is lost to rolling resistance. A comprehensive National Highway Traffic Safety (NHTSA) study showed that if rolling resistance could be reduced by, for example, 30% without sacrificing wear resistance or traction, a 3.3% increase in fuel economy would be realized. At the United States average annual consumption of over 180 billion gallons of gasoline and diesel fuel per year, tires with such a reduced rolling resistance could save 6 billion gallons of fuel annually. This is a measurable and significant component of national energy consumption. Additionally, rolling resistance can be an even more important factor in electric vehicles because it translates directly into increased driving range.

Within the tire-manufacturing industry, a "green tire" is often described as a tire optimized for low rolling resistance, using materials that are derived from renewable resources. LRR tires were first introduced into the market over 25 years ago. Unfortunately, the truly green tire remains elusive.

During the manufacture of typical LRR tread compounds, the amino- or hydroxyl functional solution polymerized styrene-butadiene rubber (SSBR) is compounded with silica using specialty silanes such as Bis(triethoxysilylpropyl) tetrasulfide (TESPT). In the initial stages of rubber compound mixing, the silane bonds with the silica to provide a tetrasulfide-functional silica. Then, during the rubber cure stage, the silica bonds to the SSBR polymer (i.e., vulcanization) to yield covalent bonds between the SSBR polymer dienes and silica filler via the TESPT silane-sulfur bridge. These covalent bonds are material to low hysteresis in LRR compounds as compared to the relatively weak polymer-filler interactions in conventional tire tread compounds that use carbon black fillers. The hysteresis is typically measured via Dynamic Mechanical Analysis (DMA) tan δ at 60° C. As an unwanted side effect, the silica-TESPT reaction results in the emissions of significant quantities of dilute ethanol vapor during rubber compounding. This has several negative effects, including detrimental environmental impact.

During the traditional development of tire rubber compounds, rolling resistance properties such as tan δ at 60° C. are balanced with other tire properties such as traction, tread wear, and fatigue endurance. All tire manufacturers currently use large quantities of generic natural rubber because it is a low-cost, renewable resource that offers excellent physical properties when compounded with carbon black (CB) as a filler. However, NR-CB compounds suffer from poor rolling resistance compared to modern compounds that are based on SSBR-TESPT-silica. This is generally because of the weak interactions between natural rubber polymer and carbon black filler that cause hysteretic energy losses with every rotation of a tire. Thus, even though NR-CB compounds are based on a renewable resource, they are not truly sustainable because of the energy losses in use from the comparatively poorer rolling resistance. Rolling resistance is the dominant factor determining the sustainability of tire rubber compounds. Secondary factors are the materials used in and the durability of the tire.

Natural rubber-silica systems and other functional natural rubber systems have been extensively studied; however, proper dispersion of silica in these systems is difficult due to high compound viscosity and low compatibility of the non-polar, high molecular weight polyisoprene and the highly polar silica. Additionally, these systems used expensive and experimental raw materials that are not available in commercial quantities, had excessively long processing times, low process yields, and created by-product waste with excessive disposal costs.

Modern tires are complex engineered composite structures comprising multiple rubber compounds and steel and textile reinforcement. Each of these compounds is formulated to meet the requirements required for specific applications, such as for use in the tread, sidewall, belt wedge, ply turn up, chafer, toe guard, apex, or body plies of a tire. Of these compounds, the tread is by far the most significant, for two reasons. First, tread compounds comprise the largest percentage of the overall tire rubber compound. Second and most importantly, the tread is the most demanding application, because the tread is the contact to the road surface where it must provide an optimum combination of high traction, high wear resistance, and low rolling resistance. Currently, this combination is maximized with the use of silica-silane in conjunction with SSBR polymer. Current polymers used in tire treads offer either high performance or renewability, but not both.

Therefore, there is a long-felt but unresolved need for a composition that includes efficient dispersion and bonding of silica within a natural rubber matrix and a method for forming the composition that is low cost and renewable.

BRIEF SUMMARY OF THE DISCLOSURE

Briefly described, and according to one embodiment, aspects of the present disclosure generally relate to natural rubber and functional silica compositions for tire manufacturing and methods for forming the same. In at least one embodiment, the disclosed composition is a renewable elastomeric polymeric composition for rubber compounding applications, such as low rolling resistance tire tread and winter tire tread applications. The disclosed composition may also reduce fuel consumption and, thus, carbon dioxide emissions in gas-powered vehicles, and increase driving range in electric vehicles, because the disclosed composition is more energy efficient than current tire material compositions.

In various embodiments, the disclosed composition may be formed by blending water-soluble silsesquioxane oligomers into a natural rubber (NR) latex system, followed by in-situ formation of a continuous, molecular silica network within the resulting polymer. In one embodiment, the resulting composition is a polymer that may be compounded into a low rolling resistance tread rubber using standard rubber compounding processes.

In one or more embodiments, the silsesquioxane oligomer solution utilized in the formation of the disclosed composition has a low molecular weight and may include between three and seven silicon atoms. In many embodiments, the silsesquioxane oligomer may have a high aqueous solubility due to the silanol functional groups and the amphoteric nature of the silsesquioxane oligomer. In at least one embodiment, the silsesquioxane oligomer and natural rubber latex may form a molecular composition with silica domains below twelve nanometers. In one embodiment, the silsesquioxane oligomer may be an aminoalkylsilsesquioxane.

In one embodiment, a natural rubber composition is disclosed including a natural rubber and an aminoalkylsilsesquioxane polymer.

In further embodiments, the natural rubber composition, wherein the aminoalkylsilsesquioxane polymer is formed from a chemical reaction including an aminoalkylsilsesquioxane oligomer having three, four, five, six, or seven silicon atoms.

In further embodiments, the natural rubber composition, wherein the aminoalkylsilsesquioxane oligomer comprises an aminoalkylsilsesquioxane-alkylsilsesquioxane copolymer oligomer.

In further embodiments, the natural rubber composition, wherein the aminoalkylsilsesquioxane oligomer comprises an aminopropylsilsesquioxane-vinylsilsesquioxane copolymer oligomer.

In further embodiments, the natural rubber composition, wherein the aminopropylsilsesquioxane-vinylsilsesquioxane copolymer oligomer has a ratio of aminopropylsilsesquioxane repeat units to vinylsilsesquioxane repeat units within the range of 3:2 to 6:1.

In further embodiments, the natural rubber composition, wherein the aminoalkylsilsesquioxane oligomer has an average molecular weight in the range of about 330 to about 552.

In further embodiments, the natural rubber composition, wherein the aminoalkylsilsesquioxane oligomer comprises an aminopropylsilsesquioxane-methylsilsesquioxane copolymer oligomer.

In further embodiments, the natural rubber composition, wherein the aminopropylsilsesquioxane-methylsilsesquioxane copolymer oligomer comprises three to five aminopropyl groups and one to two methylpropyl groups.

In further embodiments, the natural rubber composition, wherein the aminopropylsilsesquioxane-methylsilsesquioxane copolymer oligomer has a ratio of aminopropylsilsesquioxane repeat units to methylsilsesquioxane repeat units within the range of 3:2 to 6:1.

In further embodiments, the natural rubber composition, wherein the aminoalkylsilsesquioxane oligomer comprises an aminoalkylsilsesquioxane homopolymer oligomer.

In further embodiments, the natural rubber composition, wherein alkyl groups of the aminoalkylsilsesquioxane homopolymer oligomer includes one, two, three, four, five, or six carbon atoms.

In one embodiment, a method for forming a natural rubber composition is disclosed, including the steps of: mixing a natural rubber latex with a silsesquioxane oligomer solution; and drying the resulting mixture.

In further embodiments, the drying process includes: adding the mixture to a substrate such as a tray, sheet, or belt, partially drying the mixture to form a solid, removing the partially dried mixture from the substrate, and completing the drying process on an open rack or other device such that all sides of the partially dried mixture are exposed to the drying environment.

In further embodiments, wherein the drying process is a continuous drying process.

In further embodiments, the method wherein the silsesquioxane oligomer is water soluble.

In further embodiments, the method further including the step of: mixing a stabilizer with the silsesquioxane oligomer solution prior to mixing the silsesquioxane oligomer solution with the natural rubber latex.

In further embodiments, the method wherein the stabilizer is selected from a group including glucono delta-lactone, gluconic acid, glycols, acid, and surfactants. In further embodiments, the method further including the step of: adding precipitated silica to the resulting mixture prior to drying the resulting mixture.

In further embodiments, the method wherein the silsesquioxane oligomer is an aminoalkylsilsesquioxane oligomer.

In further embodiments, the method wherein the aminoalkylsilsesquioxane oligomer is selected from a group including aminopropylsilsesquioxane-vinylsilsesquioxane copolymer oligomer and aminopropylsilsesquioxane-methylsilsesquioxane copolymer oligomer.

In one embodiment, a rubber processing additive is disclosed, including an aqueous aminoalkylsilsesquioxane oligomer solution and a stabilizer.

In further embodiments, the rubber processing additive wherein the stabilizer is selected from a group comprising glycols, glucono delta-lactone, gluconic acid, acid, and surfactants.

In one embodiment, a natural rubber composition is disclosed including natural rubber and an aminoalkylsilsesquioxane polymer.

In further embodiments, the natural rubber composition wherein the aminoalkylsilsesquioxane polymer is the reaction product of an aminoalkylsilsesquioxane oligomer having from 3 to 7 silicon atoms.

In further embodiments, the natural rubber composition wherein the aminoalkylsilsesquioxane polymer is the reaction product of an aminoalkylsilsesquioxane oligomer having from 3 to 5 silicon atoms.

In further embodiments, the natural rubber composition wherein the aminoalkylsilsesquioxane polymer is the reaction product of an aminoalkylsilsesquioxane oligomer has 3 silicon atoms.

In further embodiments, the natural rubber composition wherein the aminoalkylsilsesquioxane polymer is the reaction product of an aminoalkylsilsesquioxane oligomer has 4 silicon atoms.

In further embodiments, the natural rubber composition wherein the aminoalkylsilsesquioxane oligomer is an aminopropylsilsesquioxane-methylsilsesquioxane copolymer oligomer.

In further embodiments, the natural rubber composition wherein the aminopropylsilsesquioxane-methylsilsesquioxane copolymer oligomer is has 3 to 5 aminopropyl groups and 1 or 2 methylpropyl groups.

In further embodiments, the natural rubber composition wherein the aminopropylsilsesquioxane-methylsilsesquioxane copolymer oligomer is has 3 to 5 aminopropyl groups and 1 methylpropyl group.

In further embodiments, the natural rubber composition wherein the aminopropylsilsesquioxane-methylsilsesquioxane copolymer oligomer is has 4 aminopropyl groups and 1 methylpropyl group.

In further embodiments, the natural rubber composition wherein the aminopropylsilsesquioxane-methylsilsesquioxane copolymer oligomer is has 3 aminopropyl groups and 1 methylpropyl group.

In further embodiments, the natural rubber composition wherein the aminoalkylsilsesquioxane oligomer is an aminoalkylsilsesquioxane homopolymer oligomer.

In further embodiments, the natural rubber composition wherein the aminoalkylsilsesquioxane homopolymer oligomer has alkyl groups that contain from 1 to 6 carbon atoms.

In further embodiments, the natural rubber composition wherein the aminoalkylsilsesquioxane homopolymer oligomer has alkyl groups that contain from 2 to 4 carbon atoms.

In further embodiments, the natural rubber composition wherein the aminoalkylsilsesquioxane homopolymer oligomer has alkyl groups that contain 3 carbon atoms.

In further embodiments, the natural rubber composition wherein the aminoalkylsilsesquioxane oligomer is an aminopropylsilsesquioxane-vinylsilsesquioxane copolymer oligomer.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 3:2 to 6:1.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 2:1 to 5:1.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 2:1 to 4:1.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 2:1 to 3:1.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 9:4 to 11:4.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 3:2 to 6:1.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 2:1 to 5:1.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 2:1 to 4:1.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 2:1 to 3:1.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 9:4 to 11:4.

In further embodiments, the natural rubber composition wherein the aminoalkylsilsesquioxane oligomer has an average molecular weight of less than about 850.

In further embodiments, the natural rubber composition wherein the aminoalkylsilsesquioxane oligomer has an average molecular weight which is within the range of about 250 to about 600.

In further embodiments, the natural rubber composition wherein the aminoalkylsilsesquioxane oligomer has an average molecular weight which is within the range of about 300 to about 550.

In further embodiments, the natural rubber composition wherein the aminoalkylsilsesquioxane oligomer has an average molecular weight which is within the range of about 350 to about 500.

In further embodiments, the natural rubber composition wherein the aminoalkylsilsesquioxane oligomer is an aminoalkylsilsesquioxane-alkylsilsesquioxane copolymer oligomer.

In further embodiments, the natural rubber composition wherein the aminoalkylsilsesquioxane-alkylsilsesquioxane copolymer oligomer has aminoalkylsilsesquioxane repeat units with alkyl groups having from 1 to 6 carbon atoms and alkylsilsesquioxane repeat units with alkyl groups having from 1 to 6 carbon atoms.

In further embodiments, the natural rubber composition wherein the aminoalkylsilsesquioxane-alkylsilsesquioxane copolymer oligomer has aminoalkylsilsesquioxane repeat units with alkyl groups having from 2 to 6 carbon atoms and alkylsilsesquioxane repeat units with alkyl groups having from 1 to 4 carbon atoms.

In further embodiments, the natural rubber composition wherein the aminoalkylsilsesquioxane-alkylsilsesquioxane copolymer oligomer has aminoalkylsilsesquioxane repeat units with alkyl groups having 3 or 4 carbon atoms and alkylsilsesquioxane repeat units with alkyl groups having from 1 to 3 carbon atoms.

According to another aspect, disclosed is a non-productive rubber formulation including the natural rubber composition as specified elsewhere herein and a reinforcing silica filler.

In further embodiments, the non-productive rubber formulation wherein said composition is further included of carbon black.

In further embodiments, the non-productive rubber formulation wherein said composition is further included of an additional natural rubber and/or one or more synthetic rubbers.

In further embodiments, the non-productive rubber formulation wherein said synthetic rubbers are selected from the group consisting of high cis-1,4-polybutadiene rubber, medium vinyl polybutadiene rubber, high vinyl polybutadiene rubber, synthetic polyisoprene rubber, isoprene-butadiene rubber, solution styrene-butadiene rubber, emulsion styrene-butadiene rubber, styrene-isoprene rubber, and styrene-isoprene-butadiene rubber.

In further embodiments, the non-productive rubber formulation wherein said composition is further included of at least one anti-degradant.

In further embodiments, the non-productive rubber formulation wherein said the reinforcing silica is present at a level which is within the range of 5 phr to 150 phr.

In further embodiments, the non-productive rubber formulation wherein said the reinforcing silica is present at a level which is within the range of 10 phr to 120 phr.

In further embodiments, the non-productive rubber formulation wherein said the reinforcing silica is present at a level which is within the range of 20 phr to 100 phr.

In further embodiments, the non-productive rubber formulation wherein said the carbon black is present at a level which is within the range of 5 phr to 100 phr.

In further embodiments, the non-productive rubber formulation wherein said the carbon black is present at a level which is within the range of 10 phr to 70 phr.

According to another aspect, disclosed is a productive rubber formulation including the non-productive rubber formulation as specified elsewhere herein and at least one rubber curative.

In further embodiments, the productive rubber formulation wherein the rubber curative is a sulfur curative.

In further embodiments, the productive rubber formulation wherein said composition is further included of at least one cure accelerator.

According to another aspect, disclosed is a rubber article including a cured rubber including the natural rubber formulation as specified elsewhere herein.

In further embodiments, the rubber article wherein said rubber article is a tire.

In further embodiments, the rubber article wherein said rubber article is a conveyor belt.

In further embodiments, the rubber article wherein said rubber article is a power transmission belt.

In one embodiment, a method of making a natural rubber composition is disclosed including (1) mixing an aqueous solution of an aminoalkylsilsesquioxane oligomer having from 3 to 7 silicon atoms into a natural rubber latex, (2) coagulating the natural rubber latex and simultaneously reacting the aminoalkylsilsesquioxane oligomer in the latex to recover a homogeneous blend of the aminoalkylsilsesquioxane oligomer and the natural rubber, and (3) removing residual water from the blend of the aminoalkylsilsesquioxane oligomer and the natural rubber.

In further embodiments, the method wherein a stabilizer is added to the latex prior to adding the aqueous solution of the aminoalkylsilsesquioxane oligomer in step (1).

In further embodiments, the method wherein the stabilizer is glucono delta-lactone.

In further embodiments, the method wherein the stabilizer is gluconic acid.

In further embodiments, the method wherein the coagulation called for in step (2) is caused by adding an acid to the latex.

In further embodiments, the method wherein the acid is added in a sufficient quantity to reduce the pH of the latex to below about 7.

In further embodiments, the method wherein the acid is added in a sufficient quantity to reduce the pH of the latex to be within the range of 6 to 6.5.

In further embodiments, the method wherein additional water is added to the latex prior to adding the aqueous solution of the aminoalkylsilsesquioxane oligomer in step (1).

In further embodiments, the method wherein the aminoalkylsilsesquioxane oligomer has from 3 to 7 silicon atoms.

In further embodiments, the method wherein the aminoalkylsilsesquioxane oligomer has from 3 to 5 silicon atoms.

In further embodiments, the method wherein the aminoalkylsilsesquioxane oligomer has 3 silicon atoms.

In further embodiments, the method wherein the aminoalkylsilsesquioxane oligomer has 4 silicon atoms.

In further embodiments, the method wherein the aminoalkylsilsesquioxane oligomer is an aminopropylsilsesquioxane-methylsilsesquioxane copolymer oligomer.

In further embodiments, the method wherein the aminopropylsilsesquioxane-methylsilsesquioxane copolymer oligomer is has 3 to 5 aminopropyl groups and 1 or 2 methylpropyl groups.

In further embodiments, the method wherein the aminopropylsilsesquioxane-methylsilsesquioxane copolymer oligomer is has 3 to 5 aminopropyl groups and 1 methylpropyl group.

In further embodiments, the method wherein the aminopropylsilsesquioxane-methylsilsesquioxane copolymer oligomer is has 4 aminopropyl groups and 1 methylpropyl group.

In further embodiments, the method wherein the aminopropylsilsesquioxane-methylsilsesquioxane copolymer oligomer is has 3 aminopropyl groups and 1 methylpropyl group.

In further embodiments, the method wherein the aminoalkylsilsesquioxane oligomer is an aminoalkylsilsesquioxane homopolymer oligomer.

In further embodiments, the method wherein the aminoalkylsilsesquioxane homopolymer oligomer has alkyl groups that contain from 1 to 6 carbon atoms.

In further embodiments, the method wherein the aminoalkylsilsesquioxane homopolymer oligomer has alkyl groups that contain from 2 to 4 carbon atoms.

In further embodiments, the method wherein the aminoalkylsilsesquioxane homopolymer oligomer has alkyl groups that contain 3 carbon atoms.

In further embodiments, the method wherein the aminoalkylsilsesquioxane oligomer is an aminopropylsilsesquioxane-vinylsilsesquioxane copolymer oligomer.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 3:2 to 6:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 5:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 4:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 3:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 9:4 to 11:4.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 3:2 to 6:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 5:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 4:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 3:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 9:4 to 11:4.

In further embodiments, the method wherein the aminoalkylsilsesquioxane oligomer has an average molecular weight of less than about 850.

In further embodiments, the method wherein the aminoalkylsilsesquioxane oligomer has an average molecular weight which is within the range of about 250 to about 600.

In further embodiments, the method wherein the aminoalkylsilsesquioxane oligomer has an average molecular weight which is within the range of about 300 to about 550.

In further embodiments, the method wherein the aminoalkylsilsesquioxane oligomer has an average molecular weight which is within the range of about 350 to about 500.

In further embodiments, the method wherein the aminoalkylsilsesquioxane oligomer is an aminoalkylsilsesquioxane-alkylsilsesquioxane copolymer oligomer.

In further embodiments, the method wherein the aminoalkylsilsesquioxane-alkylsilsesquioxane copolymer oligomer has aminoalkylsilsesquioxane repeat units with alkyl groups having from 1 to 6 carbon atoms and alkylsilsesquioxane repeat units with alkyl groups having from 1 to 6 carbon atoms.

In further embodiments, the method wherein the aminoalkylsilsesquioxane-alkylsilsesquioxane copolymer oligomer has aminoalkylsilsesquioxane repeat units with alkyl groups having from 2 to 6 carbon atoms and alkylsilsesquioxane repeat units with alkyl groups having from 1 to 4 carbon atoms.

In further embodiments, the method wherein the aminoalkylsilsesquioxane-alkylsilsesquioxane copolymer oligomer has aminoalkylsilsesquioxane repeat units with alkyl groups having 3 or 4 carbon atoms and alkylsilsesquioxane repeat units with alkyl groups having from 1 to 3 carbon atoms.

In one embodiment, a material composition is disclosed including natural rubber and a siliceous material derived from an aqueous silsesquioxane oligomer solution, the silsesquioxane further including silanol.

In further embodiments, the material composition wherein the silsesquioxane oligomer including one or more groups selected from the following: methyl, vinyl, amino, glycidyl, mercapto, disulfide, polysulfide, epoxide, hydroxyl.

In further embodiments, the material composition wherein the silsesquioxane oligomer includes 2-7 silicon atoms.

In further embodiments, the material composition wherein the silsesquioxane oligomer has an average molecular weight less than 500.

In further embodiments, the material composition further includes a stabilizer.

In further embodiments, the material composition wherein the stabilizer is selected from the group containing glucono delta-lactone, gluconic acid, surfactant.

In further embodiments, the material composition further including a crosslinking agent.

In further embodiments, the material composition wherein the crosslinking agent is reactive with one or more of the following groups: methyl, vinyl, diene, amino, glycidyl, mercapto, disulfide, polysulfide, epoxide, amine, and hydroxyl.

In further embodiments, the material composition wherein the crosslinking agent includes a reactive group selected from the group consisting of mercapto, disulfide, polysulfide, aldehyde, dialdehyde, isocyanate, diisocyanate, diol, hydroxyl, ester, vinyl, and methylol groups.

In further embodiments, the material composition wherein the crosslinking agent is selected or derived from the group containing formaldehyde, acetaldehyde, glutaraldehyde, glyoxal, succinaldehyde, polyethylene glycol, diol, polyol.

In further embodiments, the material composition that is red in color.

In another aspect, disclosed is a method for making the material composition as specified elsewhere herein, including the steps of blending a natural rubber latex with a silsesquioxane oligomer and drying the resulting blend.

In further embodiments, the method wherein the silsesquioxane oligomer is water soluble.

In further embodiments, the method wherein the aqueous solubility of the silsesquioxane oligomer is greater than 5, 10, 15, or 20%.

In further embodiments, the method wherein a stabilizer is blended with the oligomer prior to blending with the latex, wherein the stabilizer is selected from the group consisting of glucono delta-lactone, gluconic acid, acid, and surfactants.

In further embodiments, the method further including a defoamer.

In further embodiments, the method wherein the latex is concentrated or diluted.

In further embodiments, the method wherein the latex is stabilized.

In further embodiments, the method wherein the latex is stabilized prior to the silsesquioxane addition.

In further embodiments, the method wherein the latex is stabilized with ammonia.

In further embodiments, the method wherein additionally incorporates precipitated silica into the aqueous blend.

In one embodiment, a vulcanized rubber composition is disclosed including a minimum of 1, 10, 20, 30, or 40% natural rubber, a minimum ash content of 10, 15, or 20%, and any of the following characteristics: improved rolling resistance and durability; improved rolling resistance and wear resistance; a tan-delta at 60° C. of less than 0.15 or 0.10 and an E' at −20° C. of less than 20, 18, 16, 14, 12, or 10 MPa; an E' at −20° C. of less than 20, 18, 16, 14, 12, or 10 MPa and a tensile M300 of greater than 8, 10, 12, 14, or 16 MPa; and an E' at −20° C. of less than 20, 18, 16, 14, 12, or 10 MPa, a tensile M300 of greater than 8, 10, 12, 14, or 16 MPa, and a tan-delta at 60 C of less than 0.15 or 0.10.

In further embodiments, the vulcanized rubber composition further incorporating the material composition as specified elsewhere herein or the method as specified elsewhere herein.

In another aspect, disclosed is a tire tread vulcanized rubber composition incorporating the natural rubber composition as specified elsewhere herein characterized by an increase in the magic triangle property area of rolling resistance, wear resistance, and wet traction.

In further embodiments, the tire tread vulcanized rubber composition incorporating the vulcanized rubber composition as specified elsewhere herein.

In another aspect, disclosed is a tire including the vulcanized rubber composition as specified elsewhere herein and/or the tire tread vulcanized rubber composition as specified elsewhere herein.

In another aspect, the material composition, the vulcanized rubber composition, the tire tread vulcanized rubber composition, the tire, and/or the method for making the material composition, as specified elsewhere herein, wherein the natural rubber latex is substituted by an SBR emulsion.

In one embodiment, a natural rubber polyisoprene is disclosed wherein the natural rubber polyisoprene is covalently bonded to the aminopropyl group of a silsesquioxane oligomer.

In further embodiments, the natural rubber polyisoprene further incorporating the material composition, the vulcanized rubber composition, the tire tread vulcanized rubber composition, the tire, and/or the method for making the material composition.

In one embodiment, a cured rubber composition is disclosed including rubber, silica, an amino-functional silsesquioxane oligomer, characterized as having improved rolling resistance compared to a similar composition.

In further embodiments, the vulcanized rubber composition further characterized as having a TGA derivative peak which is within the range of 200° C. to 300° C. In further embodiments, the tire tread vulcanized rubber composition further characterized as having a TGA derivative shoulder between 500° C. and 600° C.

In further embodiments, the tire tread vulcanized rubber composition further characterized as having a TGA derivative peak between 200° C. and 300° C. and a TGA derivative shoulder between 500° C. and 600° C.

In further embodiments, the material composition, the vulcanized rubber composition, the tire tread vulcanized rubber composition, the tire, and/or the method for making the material composition, as specified elsewhere herein, wherein the natural rubber latex is substituted by an SBR emulsion or the natural rubber polyisoprene is substituted by an SBR polymer.

In another aspect, disclosed is a material composition as specified elsewhere herein further characterized as having silica particles less than 100 nm, 50 nm, 20 nm, or 10 nm.

In further embodiments, the material composition further characterized by the absence of tetra-alkoxysilane or polyhedral oligomeric silsesquioxane.

In another aspect, disclosed is a tire including a cured rubber composition incorporating the material composition, the vulcanized rubber composition, the tire tread vulcanized rubber composition, the tire, and/or the method for making the material composition as specified elsewhere herein.

In further embodiments, the material composition further characterized as having a Shore A hardness greater than 51.

In further embodiments, the material composition further characterized as having a Shore A hardness greater than 55.

In further embodiments, the material composition further characterized as having a Shore A hardness greater than 59.

In one embodiment, a vulcanized rubber composition is disclosed including a natural rubber and an aminoalkylsilsesquioxane polymer, wherein the vulcanized rubber composition has a TGA derivative peak which is within the range of 200° C. to 300° C.

In further embodiments, the vulcanized rubber composition further characterized by having a TGA derivative shoulder which is within the range of 500° C. to 600° C. In further embodiments, the method as specified elsewhere herein, further including step (4) allowing the aminoalkylsilsesquioxane oligomer to undergo polymerization to form a blend of aminoalkylsilsesquioxane polymer in the natural rubber. In one embodiment, a rubber processing additive is disclosed including an aqueous aminoalkylsilsesquioxane oligomer solution and glucono delta-lactone.

In one embodiment, a rubber processing additive is disclosed including an aqueous aminoalkylsilsesquioxane oligomer solution and gluconic acid.

In one embodiment, a method of making a natural rubber composition is disclosed including (1) mixing a rubber processing additive as specified elsewhere herein into a natural rubber latex, (2) coagulating the natural rubber latex and simultaneously reacting the aminoalkylsilsesquioxane oligomer in the latex to recover a homogeneous blend of the aminoalkylsilsesquioxane oligomer and the natural rubber, and (3) removing residual water from the blend of the aminoalkylsilsesquioxane oligomer and the natural rubber.

In further embodiments, the method wherein a stabilizer is added to the latex prior to adding the aqueous solution of the aminoalkylsilsesquioxane oligomer in step (1). In further embodiments, the method wherein the stabilizer is glucono delta-lactone. In further embodiments, the method wherein the stabilizer is gluconic acid.

In further embodiments, the method wherein the coagulation called for in step (2) is caused by adding an acid to the latex.

In further embodiments, the method wherein the acid is added in a sufficient quantity to reduce the pH of the latex to below about 7.

In further embodiments, the method wherein the acid is added in a sufficient quantity to reduce the pH of the latex to be within the range of 6 to 6.5.

In further embodiments, the method wherein additional water is added to the latex prior to adding the aqueous solution of the aminoalkylsilsesquioxane oligomer in step (1).

In further embodiments, the method wherein the aminoalkylsilsesquioxane oligomer has from 3 to 7 silicon atoms.

In further embodiments, the method wherein the aminoalkylsilsesquioxane oligomer has from 3 to 5 silicon atoms.

In further embodiments, the method wherein the aminoalkylsilsesquioxane oligomer has 3 silicon atoms.

In further embodiments, the method wherein the aminoalkylsilsesquioxane oligomer has 4 silicon atoms.

In further embodiments, the method wherein the aminoalkylsilsesquioxane oligomer is an aminopropylsilsesquioxane-methylsilsesquioxane copolymer oligomer.

In further embodiments, the method wherein the aminopropylsilsesquioxane-methylsilsesquioxane copolymer oligomer is has 3 to 5 aminopropyl groups and 1 or 2 methylpropyl groups.

In further embodiments, the method wherein the aminopropylsilsesquioxane-methylsilsesquioxane copolymer oligomer is has 3 to 5 aminopropyl groups and 1 methylpropyl group.

In further embodiments, the method wherein the aminopropylsilsesquioxane-methylsilsesquioxane copolymer oligomer is has 4 aminopropyl groups and 1 methylpropyl group.

In further embodiments, the method wherein the aminopropylsilsesquioxane-methylsilsesquioxane copolymer oligomer is has 3 aminopropyl groups and 1 methylpropyl group.

In further embodiments, the method wherein the aminoalkylsilsesquioxane oligomer is an aminoalkylsilsesquioxane homopolymer oligomer.

In further embodiments, the method wherein the aminoalkylsilsesquioxane homopolymer oligomer has alkyl groups that contain from 1 to 6 carbon atoms.

In further embodiments, the method wherein the aminoalkylsilsesquioxane homopolymer oligomer has alkyl groups that contain from 2 to 4 carbon atoms.

In further embodiments, the method wherein the aminoalkylsilsesquioxane homopolymer oligomer has alkyl groups that contain 3 carbon atoms.

In further embodiments, the method wherein the aminoalkylsilsesquioxane oligomer is an aminopropylsilsesquioxane-vinylsilsesquioxane copolymer oligomer.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 3:2 to 6:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 5:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 4:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 3:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 9:4 to 11:4.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 3:2 to 6:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 5:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 4:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 3:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 9:4 to 11:4.

In further embodiments, the method wherein the aminoalkylsilsesquioxane oligomer has an average molecular weight of less than about 850.

In further embodiments, the method wherein the aminoalkylsilsesquioxane oligomer has an average molecular weight which is within the range of about 250 to about 600.

In further embodiments, the method wherein the aminoalkylsilsesquioxane oligomer has an average molecular weight which is within the range of about 300 to about 550.

In further embodiments, the method wherein the aminoalkylsilsesquioxane oligomer has an average molecular weight which is within the range of about 350 to about 500.

In further embodiments, the method wherein the aminoalkylsilsesquioxane oligomer is an aminoalkylsilsesquioxane-alkylsilsesquioxane copolymer oligomer.

In further embodiments, the method wherein the aminoalkylsilsesquioxane-alkylsilsesquioxane copolymer oligomer has aminoalkylsilsesquioxane repeat units with alkyl groups having from 1 to 6 carbon atoms and alkylsilsesquioxane repeat units with alkyl groups having from 1 to 6 carbon atoms.

In further embodiments, the method wherein the aminoalkylsilsesquioxane-alkylsilsesquioxane copolymer oligomer has aminoalkylsilsesquioxane repeat units with alkyl groups having from 2 to 6 carbon atoms and alkylsilsesquioxane repeat units with alkyl groups having from 1 to 4 carbon atoms.

In further embodiments, the method wherein the aminoalkylsilsesquioxane-alkylsilsesquioxane copolymer oligomer has aminoalkylsilsesquioxane repeat units with alkyl groups having 3 or 4 carbon atoms and alkylsilsesquioxane repeat units with alkyl groups having from 1 to 3 carbon atoms.

In further embodiments, the method further including: step (4) allowing the aminoalkylsilsesquioxane oligomer to undergo polymerization to form a blend of aminoalkylsilsesquioxane polymer in the natural rubber.

In further embodiments, the method wherein a stabilizer is added to the latex prior to adding the aqueous solution of the aminoalkylsilsesquioxane oligomer in step (1).

In further embodiments, the method wherein the stabilizer is glucono delta-lactone.

In further embodiments, the method wherein the stabilizer is gluconic acid.

In further embodiments, the method wherein the coagulation called for in step (2) is caused by adding an acid to the latex.

In further embodiments, the method wherein the acid is added in a sufficient quantity to reduce the pH of the latex to below about 7.

In further embodiments, the method wherein the acid is added in a sufficient quantity to reduce the pH of the latex to be within the range of 6 to 6.5.

In further embodiments, the method wherein additional water is added to the latex prior to adding the aqueous solution of the aminoalkylsilsesquioxane oligomer in step (1).

In further embodiments, the method wherein the aminoalkylsilsesquioxane oligomer has from 3 to 7 silicon atoms.

In further embodiments, the method wherein the aminoalkylsilsesquioxane oligomer has from 3 to 5 silicon atoms.

In further embodiments, the method wherein the aminoalkylsilsesquioxane oligomer has 3 silicon atoms.

In further embodiments, the method wherein the aminoalkylsilsesquioxane oligomer has 4 silicon atoms.

In further embodiments, the method wherein the aminoalkylsilsesquioxane oligomer is an aminopropylsilsesquioxane-methylsilsesquioxane copolymer oligomer.

In further embodiments, the method wherein the aminopropylsilsesquioxane-methylsilsesquioxane copolymer oligomer is has 3 to 5 aminopropyl groups and 1 or 2 methylpropyl groups.

In further embodiments, the method wherein the aminopropylsilsesquioxane-methylsilsesquioxane copolymer oligomer is has 3 to 5 aminopropyl groups and 1 methylpropyl group.

In further embodiments, the method wherein the aminopropylsilsesquioxane-methylsilsesquioxane copolymer oligomer is has 4 aminopropyl groups and 1 methylpropyl group.

In further embodiments, the method wherein the aminopropylsilsesquioxane-methylsilsesquioxane copolymer oligomer is has 3 aminopropyl groups and 1 methylpropyl group.

In further embodiments, the method wherein the aminoalkylsilsesquioxane oligomer is an aminoalkylsilsesquioxane homopolymer oligomer.

In further embodiments, the method wherein the aminoalkylsilsesquioxane homopolymer oligomer has alkyl groups that contain from 1 to 6 carbon atoms.

In further embodiments, the method wherein the aminoalkylsilsesquioxane homopolymer oligomer has alkyl groups that contain from 2 to 4 carbon atoms.

In further embodiments, the method wherein the aminoalkylsilsesquioxane homopolymer oligomer has alkyl groups that contain 3 carbon atoms.

In further embodiments, the method wherein the aminoalkylsilsesquioxane oligomer is an aminopropylsilsesquioxane-vinylsilsesquioxane copolymer oligomer.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 3:2 to 6:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 5:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 4:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 2:1 to 3:1.

In further embodiments, the method wherein the aminopropylsilsesquioxane-methylsilsesquioxane copolymer oligomer has a ratio of aminopropylsilsesquioxane repeat units to methylsilsesquioxane repeat units which is within the range of 9:4 to 11:4.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 3:2 to 6:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 5:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 4:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 2:1 to 3:1.

In further embodiments, the method wherein the aminopropylsilsesquioxane-vinylsilsesquioxane copolymer oligomer has a ratio of aminopropylsilsesquioxane repeat units to vinylsilsesquioxane repeat units which is within the range of 9:4 to 11:4.

In further embodiments, the method wherein the aminoalkylsilsesquioxane oligomer has an average molecular weight of less than about 850.

In further embodiments, the method wherein the aminoalkylsilsesquioxane oligomer has an average molecular weight which is within the range of about 250 to about 600.

In further embodiments, the method wherein the aminoalkylsilsesquioxane oligomer has an average molecular weight which is within the range of about 300 to about 550.

In further embodiments, the method wherein the aminoalkylsilsesquioxane oligomer has an average molecular weight which is within the range of about 350 to about 500.

In further embodiments, the method wherein the aminoalkylsilsesquioxane oligomer is an aminoalkylsilsesquioxane-alkylsilsesquioxane copolymer oligomer.

In further embodiments, the method wherein the aminoalkylsilsesquioxane-alkylsilsesquioxane copolymer oligomer has aminoalkylsilsesquioxane repeat units with alkyl groups having from 1 to 6 carbon atoms and alkylsilsesquioxane repeat units with alkyl groups having from 1 to 6 carbon atoms.

In further embodiments, the method wherein the aminoalkylsilsesquioxane-alkylsilsesquioxane copolymer oligomer has aminoalkylsilsesquioxane repeat units with alkyl groups having from 2 to 6 carbon atoms and alkylsilsesquioxane repeat units with alkyl groups having from 1 to 4 carbon atoms.

In further embodiments, the method wherein the aminoalkylsilsesquioxane-alkylsilsesquioxane copolymer oligomer has aminoalkylsilsesquioxane repeat units with alkyl groups having 3 or 4 carbon atoms and alkylsilsesquioxane repeat units with alkyl groups having from 1 to 3 carbon atoms.

In one embodiment, a natural rubber composition is disclosed including natural rubber and an aminoalkylsilsesquioxane polymer, the aminoalkylsilsesquioxane polymer including silanol.

In further embodiments, the natural rubber composition wherein the aminoalkylsilsesquioxane polymer is the reaction product of an aminoalkylsilsesquioxane oligomer having from 3 to 7 silicon atoms, the aminoalkylsilsesquioxane polymer including silanol.

In further embodiments, the natural rubber composition wherein the aminoalkylsilsesquioxane polymer is the reaction product of an aminoalkylsilsesquioxane oligomer having from 3 to 5 silicon atoms, the aminoalkylsilsesquioxane polymer including silanol.

In further embodiments, the natural rubber composition wherein the aminoalkylsilsesquioxane polymer is the reaction product of an aminoalkylsilsesquioxane oligomer has 3 silicon atoms, the aminoalkylsilsesquioxane polymer including silanol.

In further embodiments, the natural rubber composition wherein the aminoalkylsilsesquioxane polymer is the reaction product of an aminoalkylsilsesquioxane oligomer has 4 silicon atoms, the aminoalkylsilsesquioxane polymer including silanol.

In further embodiments, the natural rubber composition wherein the aminoalkylsilsesquioxane oligomer is an aminopropylsilsesquioxane-methylsilsesquioxane copolymer oligomer including silanol.

In further embodiments, the natural rubber composition wherein the aminopropylsilsesquioxane-methylsilsesquioxane copolymer oligomer is has 3 to 5 aminopropyl groups and 1 or 2 methylpropyl groups including silanol.

In further embodiments, the natural rubber composition wherein the aminopropylsilsesquioxane-methylsilsesquioxane copolymer oligomer is has 3 to 5 aminopropyl groups and 1 methylpropyl group, the oligomer further including silanol.

In further embodiments, the natural rubber composition wherein the aminopropylsilsesquioxane-methylsilsesquioxane copolymer oligomer is has 4 aminopropyl groups and 1 methylpropyl group, the oligomer further including silanol.

In further embodiments, the natural rubber composition wherein the aminopropylsilsesquioxane-methylsilsesquioxane copolymer oligomer is has 3 aminopropyl groups and 1 methylpropyl group, the oligomer further including silanol.

In further embodiments, the natural rubber composition wherein the aminoalkylsilsesquioxane oligomer is an aminoalkylsilsesquioxane homopolymer oligomer, the oligomer further including silanol.

In further embodiments, the natural rubber composition wherein the aminoalkylsilsesquioxane homopolymer oligomer has alkyl groups that contain from 1 to 6 carbon atoms, the oligomer further including silanol.

In further embodiments, the natural rubber composition wherein the aminoalkylsilsesquioxane homopolymer oligomer has alkyl groups that contain from 2 to 4 carbon atoms, the oligomer further including silanol.

In further embodiments, the natural rubber composition wherein the aminoalkylsilsesquioxane homopolymer oligomer has alkyl groups that contain 3 carbon atoms, the oligomer further including silanol.

In further embodiments, the natural rubber composition wherein the aminoalkylsilsesquioxane oligomer is an aminopropylsilsesquioxane-vinylsilsesquioxane copolymer oligomer, the oligomer further including silanol.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 3:2 to 6:1, the oligomer further including silanol.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 2:1 to 5:1, the oligomer further including silanol.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 2:1 to 4:1, the oligomer further including silanol.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 2:1 to 3:1, the oligomer further including silanol.

In further embodiments, the natural rubber composition wherein the aminopropylsilsesquioxane-methylsilsesquioxane copolymer oligomer has a ratio of aminopropylsilsesquioxane repeat units to methylsilsesquioxane repeat units which is within the range of 9:4 to 11:4, the oligomer further including silanol.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 3:2 to 6:1, the oligomer further including silanol.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 2:1 to 5:1, the oligomer further including silanol.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 2:1 to 4:1, the oligomer further including silanol.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 2:1 to 3:1, the oligomer further including silanol.

In further embodiments, the natural rubber composition wherein the aminopropylsilsesquioxane-vinylsilsesquioxane copolymer oligomer has a ratio of aminopropylsilsesquioxane repeat units to vinylsilsesquioxane repeat units which is within the range of 9:4 to 11:4, the oligomer further including silanol.

In further embodiments, the natural rubber composition wherein the aminoalkylsilsesquioxane oligomer has an average molecular weight of less than about 850, the oligomer further including silanol.

In further embodiments, the natural rubber composition wherein the aminoalkylsilsesquioxane oligomer has an average molecular weight which is within the range of about 250 to about 600, the oligomer further including silanol.

In further embodiments, the natural rubber composition wherein the aminoalkylsilsesquioxane oligomer has an average molecular weight which is within the range of about 300 to about 550, the oligomer further including silanol.

In further embodiments, the natural rubber composition wherein the aminoalkylsilsesquioxane oligomer has an average molecular weight which is within the range of about 350 to about 500, the oligomer further including silanol.

In further embodiments, the natural rubber composition wherein the aminoalkylsilsesquioxane oligomer is an aminoalkylsilsesquioxane-alkylsilsesquioxane copolymer oligomer, the oligomer further including silanol.

In further embodiments, the natural rubber composition wherein the aminoalkylsilsesquioxane-alkylsilsesquioxane copolymer oligomer has aminoalkylsilsesquioxane repeat units with alkyl groups having from 1 to 6 carbon atoms and alkylsilsesquioxane repeat units with alkyl groups having from 1 to 6 carbon atoms, the oligomer further including silanol.

In further embodiments, the natural rubber composition wherein the aminoalkylsilsesquioxane-alkylsilsesquioxane copolymer oligomer has aminoalkylsilsesquioxane repeat units with alkyl groups having from 2 to 6 carbon atoms and alkylsilsesquioxane repeat units with alkyl groups having from 1 to 4 carbon atoms, the oligomer further including silanol.

In further embodiments, the natural rubber composition wherein the aminoalkylsilsesquioxane-alkylsilsesquioxane copolymer oligomer has aminoalkylsilsesquioxane repeat units with alkyl groups having 3 or 4 carbon atoms and alkylsilsesquioxane repeat units with alkyl groups having from 1 to 3 carbon atoms, the oligomer further including silanol.

In another aspect, disclosed is a non-productive rubber formulation including the natural rubber composition as specified elsewhere herein and a reinforcing silica filler.

In further embodiments, the non-productive rubber formulation wherein the natural rubber composition includes carbon black.

In further embodiments, the non-productive rubber formulation wherein the natural rubber composition includes an additional natural rubber and/or one or more synthetic rubbers.

In further embodiments, the non-productive rubber formulation wherein the one or more synthetic rubbers are selected from the group consisting of high cis-1,4-polybutadiene rubber, medium vinyl polybutadiene rubber, high vinyl polybutadiene rubber, synthetic polyisoprene rubber, isoprene-butadiene rubber, solution styrene-butadiene rubber, emulsion styrene-butadiene rubber, styrene-isoprene rubber, and styrene-isoprene-butadiene rubber.

In further embodiments, the non-productive rubber formulation wherein the natural rubber composition includes at least one anti-degradant.

In further embodiments, the non-productive rubber formulation wherein the reinforcing silica filler is present at a level which is within the range of 5 phr to 150 phr.

In further embodiments, the non-productive rubber formulation wherein the reinforcing silica filler is present at a level which is within the range of 10 phr to 120 phr.

In further embodiments, the non-productive rubber formulation wherein the reinforcing silica filler is present at a level which is within the range of 20 phr to 100 phr.

In further embodiments, the non-productive rubber formulation wherein the carbon black is present at a level which is within the range of 5 phr to 100 phr.

In further embodiments, the non-productive rubber formulation wherein the carbon black is present at a level which is within the range of 10 phr to 70 phr.

In another aspect, disclosed is a productive rubber formulation including the non-productive rubber formulation as specified elsewhere herein and at least one rubber curative.

In further embodiments, the productive rubber formulation wherein the at least one rubber curative is a sulfur curative.

In further embodiments, the productive rubber formulation wherein the natural rubber composition includes at least one cure accelerator.

In another aspect, disclosed is a rubber article including a cured rubber, wherein the cured rubber includes the natural rubber formulation as specified elsewhere herein.

In further embodiments, the rubber article wherein said rubber article is a tire.

In further embodiments, the rubber article wherein said rubber article is a conveyor belt.

In further embodiments, the rubber article wherein said rubber article is a power transmission belt.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
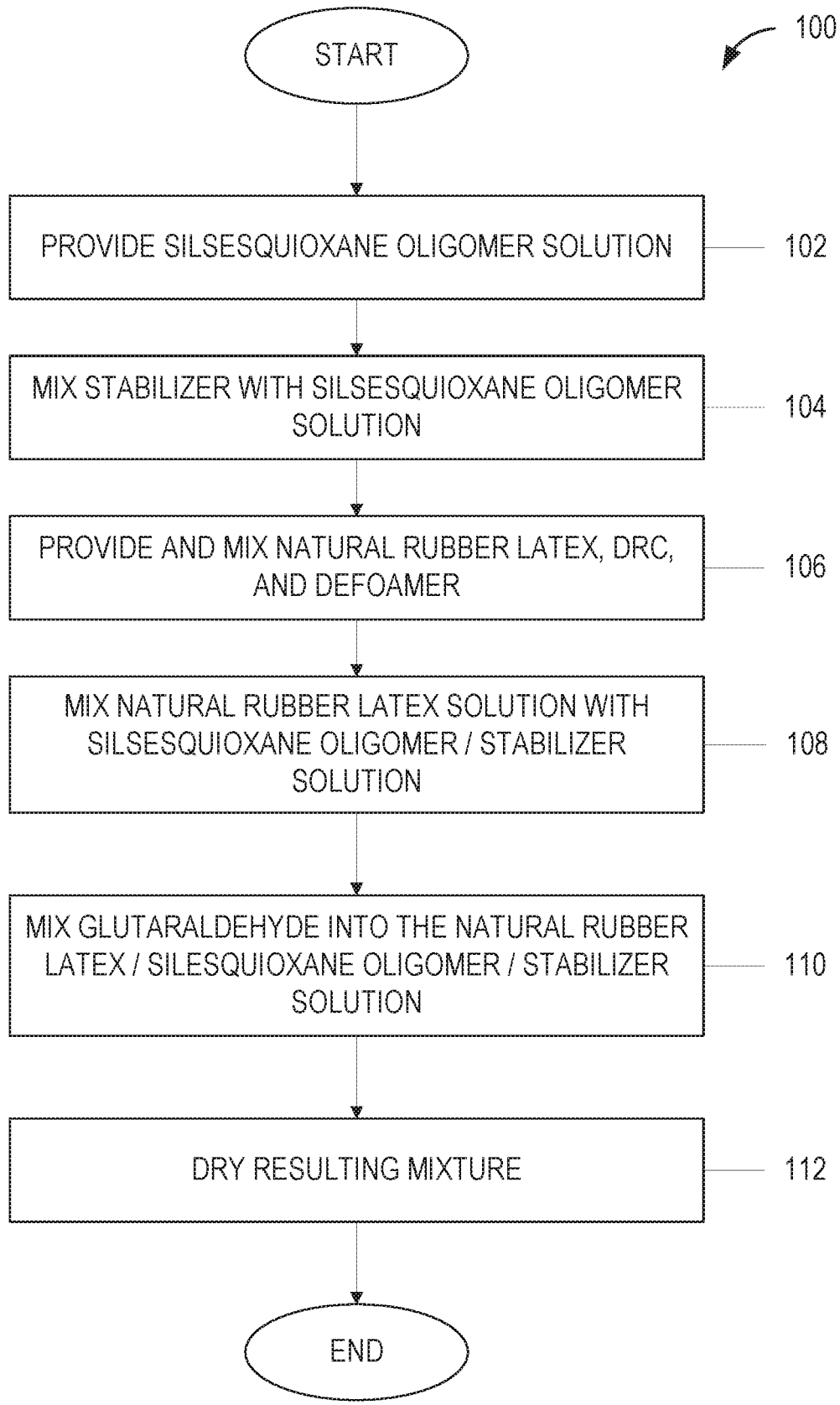
FIG. 1 illustrates an exemplary method for formulating an exemplary composition, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

The present disclosure relates generally to rubber composites and methods of making the same, and more particularly to compositions comprising natural rubber and aminoalkylsilsesquioxane polymer, as well as methods for making the same. In various embodiments, a chemical composition is created via blending of water-soluble silsesquioxane oligomers into a natural rubber (NR) latex system, followed by in-situ formation of a continuous, molecular silica network within the polymer. The resulting disclosed composition may be compounded into a low rolling resistance tread rubber for tire manufacturing.

In various embodiments, a molecular composition (also, "composite") of functional silica in a natural rubber latex/polymer system using a stable, highly concentrated, low molecular weight silsesquioxane (SSQ) oligomeric aqueous solution is disclosed. Generally, the use of SSQ to reinforce natural rubber is not known to those skilled in the art of rubber compounding, nor is such a use suggested by the manufacturers of such compounds. In many embodiments, the composition may be created via liquid phase mixing. In many embodiments, the low molecular weight, high aqueous solubility, and amphoteric solubilization character of the silsesquioxane oligomer provides unique opportunities for interaction with the natural rubber (isoprene) chain ends and the phospholipid/protein layer on the natural rubber latex particles. In one embodiment, the disclosed composition of silica in natural rubber may provide for improved properties and processing of low rolling resistance tread compounds and may enable a new generation of lower cost and more sustainable low rolling resistance tires.

In multiple embodiments, the siloxane utilized in the formation of the disclosed composition may have concentrations higher than or equal to 5.0%, which is generally much higher than typical usage of silanes and siloxanes in aqueous solutions due to solubility limitations (0.1-0.5%). In one or more embodiments, the siloxanes used in embodiments of the composition formation are amphoterically stabilized. In at least one embodiment, the high siloxane concentration enables the resulting silica network to function as a structural reinforcement agent and not simply as an adhesion promoter or primer.

In various embodiments, low molecular weight silsesquioxane oligomers (3 to 7 silicon atoms) may be utilized in the formation of the disclosed composition. In at least one embodiment, the silsesquioxane oligomer utilized may have a main chain that includes 3, 4, 5, 6, or 7 silicon atoms. In at least one embodiment, the molecular weight of the silsesquioxane oligomer having 3 to 7 silicon atoms in the main chain may be within the range of approximately 330 to 552. In many embodiments, the molecular weight of the silsesquioxane oligomer having 3 to 7 silicon atoms in the main chain may be as much as approximately 850. In one embodiment, the lower molecular weight, as opposed to the molecular weight of a silsesquioxane oligomer having 8 silicon atoms, provides better mobility, dispersion, and latex polymer interaction between the silsesquioxane oligomer and the natural rubber latex. In one or more embodiments, the higher molecular weight silsesquioxane oligomer may not be soluble at high concentrations and low viscosity, which would cause any resulting silica network to not function as a structural reinforcement agent for the natural rubber.

In several embodiments, the addition of one or more stabilizers stabilizes the silsesquioxane oligomer solution and natural rubber latex mixture. In one or more embodiments, the natural rubber particles may be stabilized by proteins and phospholipids such as the addition of one or more stabilizers. In one embodiment, the stabilizer may be glucono delta-lactone, ammonia, or a similar chemical. In at least one embodiment, the silsesquioxane oligomer solution, without a stabilizer, may not be compatible with natural rubber latex because the SSQ destabilizes the natural rubber latex particles. In many embodiments, the SSQ/natural rubber latex mixture may undergo a reaction process, which causes the silicon to be distributed through the resulting natural rubber polymer. In one embodiment, the reaction process may be a coagulation/condensation reaction. In at least one embodiment, the SSQ reacts to form a network throughout the natural rubber polymer. In one or more embodiments, previous methods using dispersions of discrete silica particles were unable to form molecular-scale composites, because the discrete silica particles dispersed were not small enough to form molecular scale composites.

In various embodiments, the addition of the stabilizer, for example, glucono delta-lactone, and coordinated coagulation/condensation reaction reduces the mixture from its initial pH 10.5 state to a neutral pH gradually through the addition of the stabilizer. In at least one embodiment, in the coagulation/condensation reaction, the natural rubber latex coagulates to form a natural rubber gel, and the silsesquioxane oligomer undergoes a condensation reaction to form silica. In many embodiments, the gradual reduction in pH achieved through the gradual acidification of the stabilizer enables controlled coagulation of the natural rubber latex at the same time that the silsesquioxane oligomer is condensating into a reinforcing silica network. In one or more embodiments, other stabilizers used to disperse and stabilize the system may include, for example, glycols and surfactants, and other additives (for example, acids with or without buffers) may be used to induce the coagulation/precipitation reaction.

In several embodiments, the silsesquioxane oligomers are formed at high pH from amino-functional silanes that form stable oligomers at high concentrations. In many embodiments, the silsesquioxane oligomers may include other functional groups in addition to amino functional group. In one or more embodiments, the silsesquioxane oligomer in aqueous solution may contain at least one silanol group (Si—O—H). In at least one embodiment, additional functional groups may include, but are not limited to, methyl, vinyl, mercapto, mercaptopropyl, glycidoxypropyl, disulphide, and polysulphide functional silanes. In one embodiment, the silsesquioxane oligomer may be an aminoalkylsilsesquioxane oligomer. In one or more embodiments, examples of an aminoalkylsilsesquioxane oligomer may include, but are not limited to, aminopropylsilsesquioxane-methylsilsesquioxane copolymer oligomer or aminopropylsilsesquioxane-vinylsilsesquioxane copolymer oligomer. In many embodiments, the silsesquioxane oligomer may be an aminoalkylsilsesquioxane homopolymer oligomer. In multiple embodiments, the alkyl group or groups in the aminoalkylsilsesquioxane oligomer may contain 1, 2, 3, 4, 5, or 6 carbon atoms. In one embodiment, the aminoalkylsilsesquioxane oligomer may have a structure of:

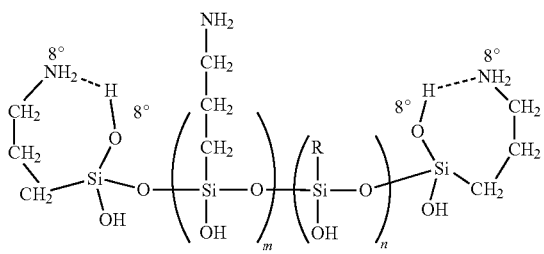

where R is a functional group, n is at least 1, and the sum of m and n is less than or equal to 5.

In various embodiments, the aminoalkylsilsesquioxane oligomer may include one or more repeat units. In at least one embodiment, repeat units are a part of an oligomer or polymer, the repetition of which produces the oligomer or polymer. For example, in one embodiment, the aminoalkylsilsesquioxane oligomer may have two or three aminofunctional silanes and one additional silane, for a ratio of two or three aminofunctional silanes to one additional silane (2:1 or 3:1).

In one or more embodiments, other elastomeric latexes may be substituted for the natural rubber latex. For example, in one embodiment, an SBR emulsion may be substituted in whole or in part for the natural rubber latex.

Referring now to the figures, for the purposes of example and explanation of the fundamental processes and components of the disclosed systems and methods, reference is made to FIG. 1, which illustrates an exemplary method 100 for formulating an exemplary composition, according to one embodiment of the present disclosure. As will be understood and appreciated, the exemplary method 100 shown in FIG. 1 represents merely one approach or embodiment of the present disclosure, and other aspects are used according to various embodiments of the present disclosure.

As shown in FIG. 1, an exemplary method 100 for formulating an exemplary natural rubber composition is described. According to one embodiment, at step 102 of method 100, a silsesquioxane oligomer solution may be provided. In one or more embodiments, the silsesquioxane oligomer solution may be approximately a 20% silsesquioxane oligomer solution. In at least one embodiment, the silsesquioxane oligomer solution may be water soluble and/or in an aqueous solution. In one embodiment, the silsesquioxane oligomer may be an aminoalkylsilsesquioxane oligomer, an aminoalkylsilsesquioxane-alkylsilsesquioxane co-oligomer, an aminoalkylsilsesquioxane homopolymer oligomer, or an aminoalkylsilsesquioxane-alkylsilsesquioxane co-oligomer. For example, in one embodiment, the silsesquioxane oligomer may be aminopropylsilsesquioxane-vinylsilsesquioxane copolymer oligomer, aminopropylsilsesquioxane-methylsilsesquioxane copolymer oligomer, or other similar compound.

At step 104, in multiple embodiments, a stabilizer may be provided and mixed with the silsesquioxane oligomer solution. In one embodiment, the stabilizer may be mixed with a natural rubber latex (as discussed in step 106 below) rather than the silsesquioxane oligomer solution. In many embodiments, the stabilizer may be glucono delta-lactone, gluconic acid, glycols, acid, or surfactants, or other similar compounds. In at least one embodiment, the stabilizer and silsesquioxane oligomer solution may be mixed for a specific amount of time, such as, for example, approximately 600 seconds.

At step 106, in several embodiments, a natural rubber latex, and a defoamer may be provided and mixed together. In many embodiments, the natural rubber latex may be approximately a 62% natural rubber latex. In one or more embodiments, the defoamer may be Defoamer BYK-1740 or another similar compound. In at least one embodiment, the natural rubber latex, and defoamer may be mixed for a specific amount of time, such as, for example, approximately 30 seconds. In one embodiment, the natural rubber latex, and defoamer may be mixed via a low-shear mix. In a further embodiment, after the natural rubber latex, and defoamer have been mixed together, a precipitated silica powder may be added and mixed to the resulting natural rubber latex/defoamer mixture. In one embodiment, the precipitated silica powder may be Solvay Z1165MP or a similar precipitated silica powder.

At step 108, in various embodiments, the resulting mixture from step 104 and the resulting mixture from step 106 may be mixed together. In one or more embodiments, the resulting mixture from step 104 and the resulting mixture from step 106 may be mixed together via low-shear mix. In at least one embodiment, the resulting mixture from step 104 and the resulting mixture from step 106 may be mixed for a specific period of time, such as, for example, approximately 300 seconds.

At step 110, in multiple embodiments, glutaraldehyde may be mixed into the resulting mixture from step 108. In one embodiment, the glutaraldehyde may be a 2% glutaraldehyde in an aqueous solution. In one or more embodiments, the glutaraldehyde may be mixed into the resulting mixture from step 108 for a specific period of time, such as, for example, 600 seconds. In at least one embodiment, the glutaraldehyde may be mixed into the resulting mixture from step 108 via a low-shear mix. In an alternate embodiment, the glutaraldehyde may not be mixed, and the process may skip step 110 and go directly to step 112 from step 108.

At step 112, in several embodiments, the resulting mixture from step 110 may be dried. In many embodiments, the resulting mixture from step 110 may be dried for a specific amount of time. In one or more embodiments, the resulting mixture from step 110 may be dried at a specific temperature. For example, in one embodiment, the resulting mixture from step 110 may be dried for approximately 48 hours at 60 degrees C.

In various embodiments, the resulting compound following the drying in step 112 is an exemplary natural rubber/silsesquioxane polymer composition.

Figure 2:
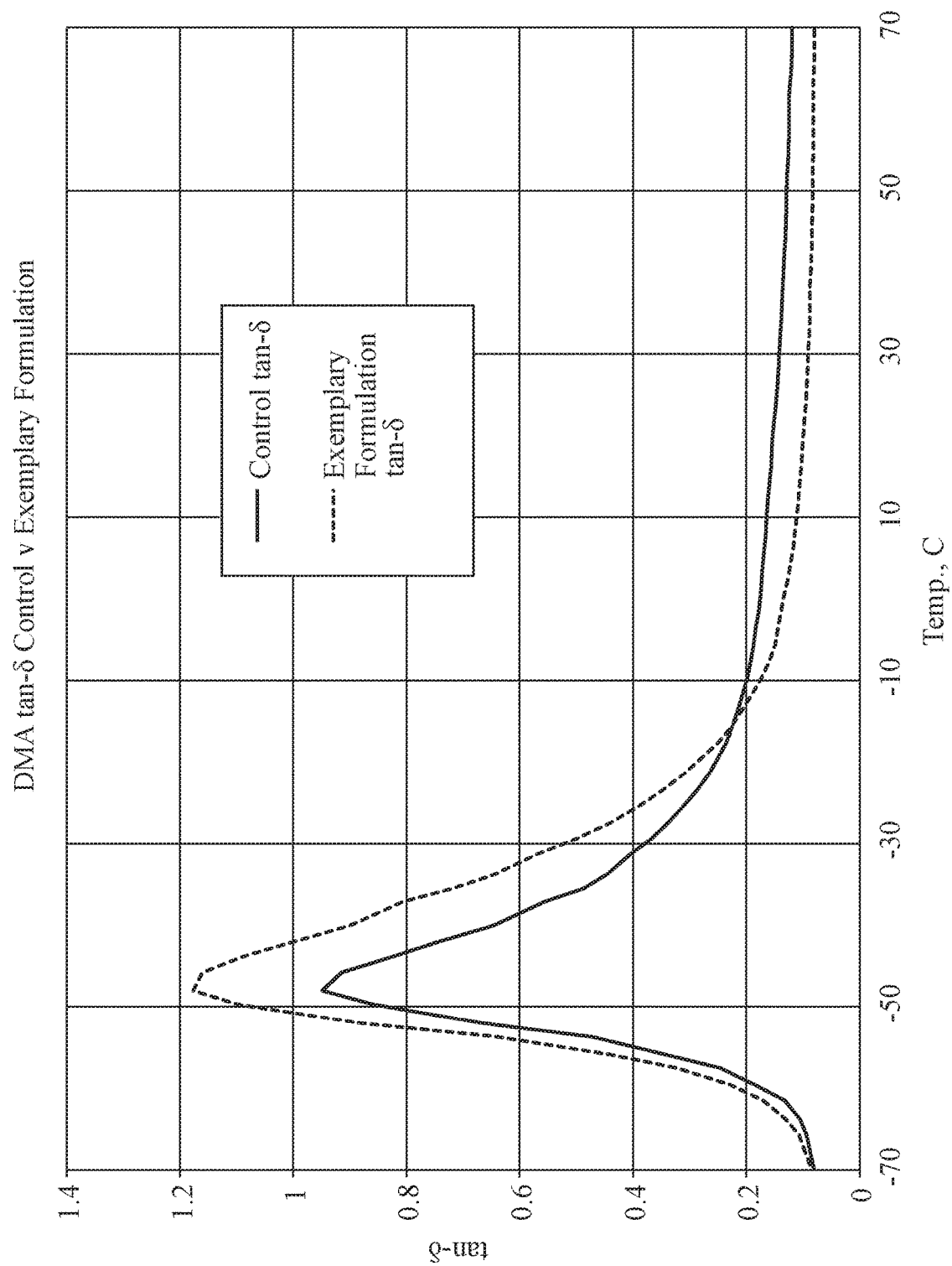
FIG. 2 is a graph of the DMA tan-δ of an exemplary composition compared to a control, according to one embodiment of the present disclosure.

Turning to FIG. 2, a graph of the DMA tan-δ of an exemplary composition compared to a control, according to one embodiment of the present disclosure. In various embodiments, FIG. 2 shows the Dynamic Mechanical Analysis (DMA) tan-δ of the disclosed composition (Exemplary Formulation tan-δ). In many embodiments, DMA tan-δ may measure the hysteresis of the disclosed composition. In one or more embodiments, the disclosed composition has a lower tan-δ than the control at temperatures higher than about −13 degrees Celsius. In one embodiment, the lower DMA measurement of the disclosed composition may be indicative of improved bond formations between the natural rubber latex and the silica from the silsesquioxane oligomer. In at least one embodiment, the control graphed in FIG. 2 is a natural rubber latex that is not mixed with a silsesquioxane or glucono delta-lactone (compound 1 from Example 3 below).

Figure 3:
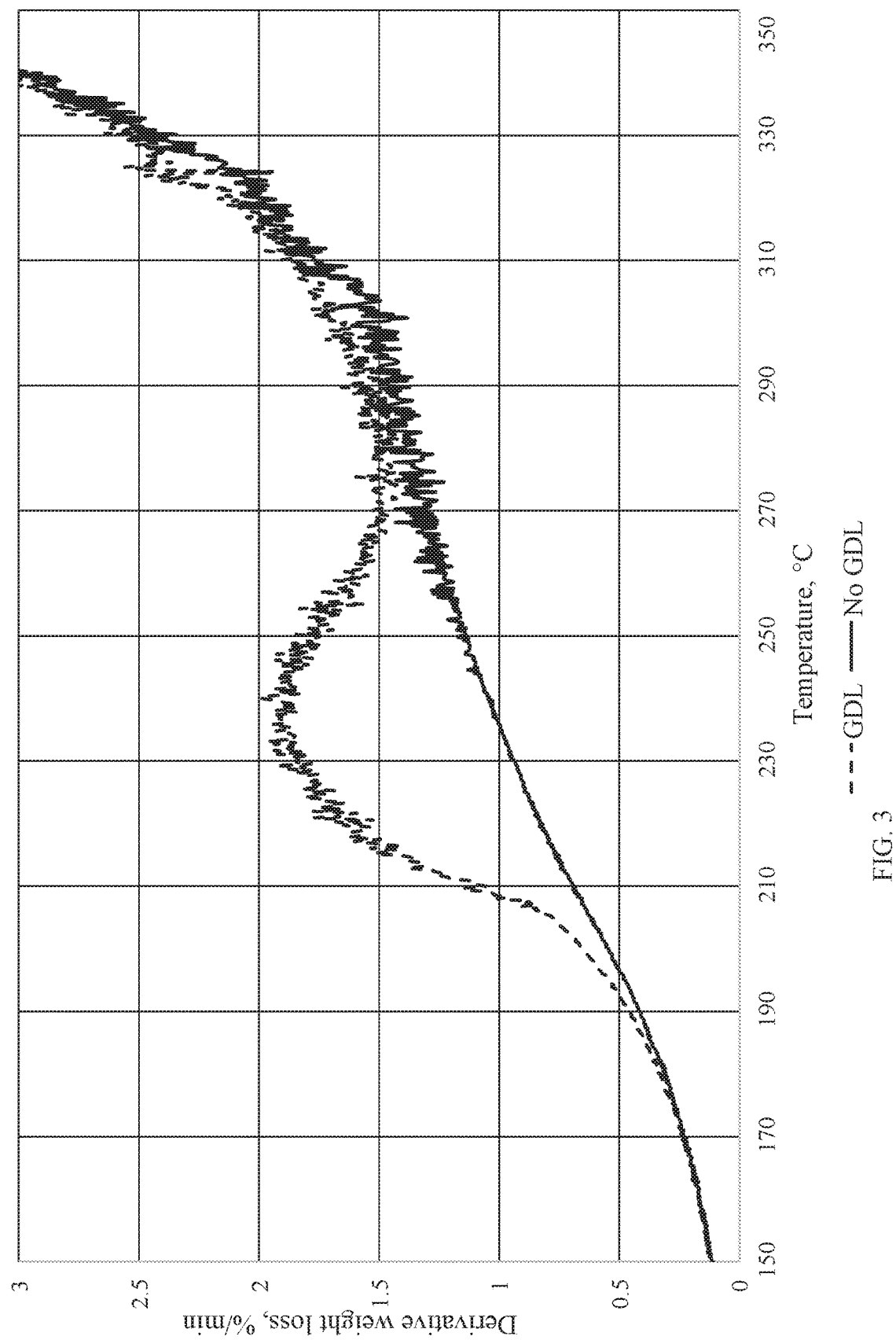
FIG. 3 is a graph of the Thermogravimetric Analysis (TGA) Derivative for an exemplary composition including GDL compared to a control not including GDL, according to one embodiment of the present disclosure.

Turning to FIG. 3, a graph of the TGA Derivative for an exemplary composition including GDL compared to a control that does not include GDL is shown, according to one embodiment of the present disclosure. In one or more embodiments, the derivative peak between 190-290° C. indicates the presence of GDL. In several embodiments, the control in FIG. 3 did not have GDL mixed into the silsesquioxane oligomer solution or in the natural rubber latex mixture (Sample 5 of Example 3, see below).

Figure 4A:
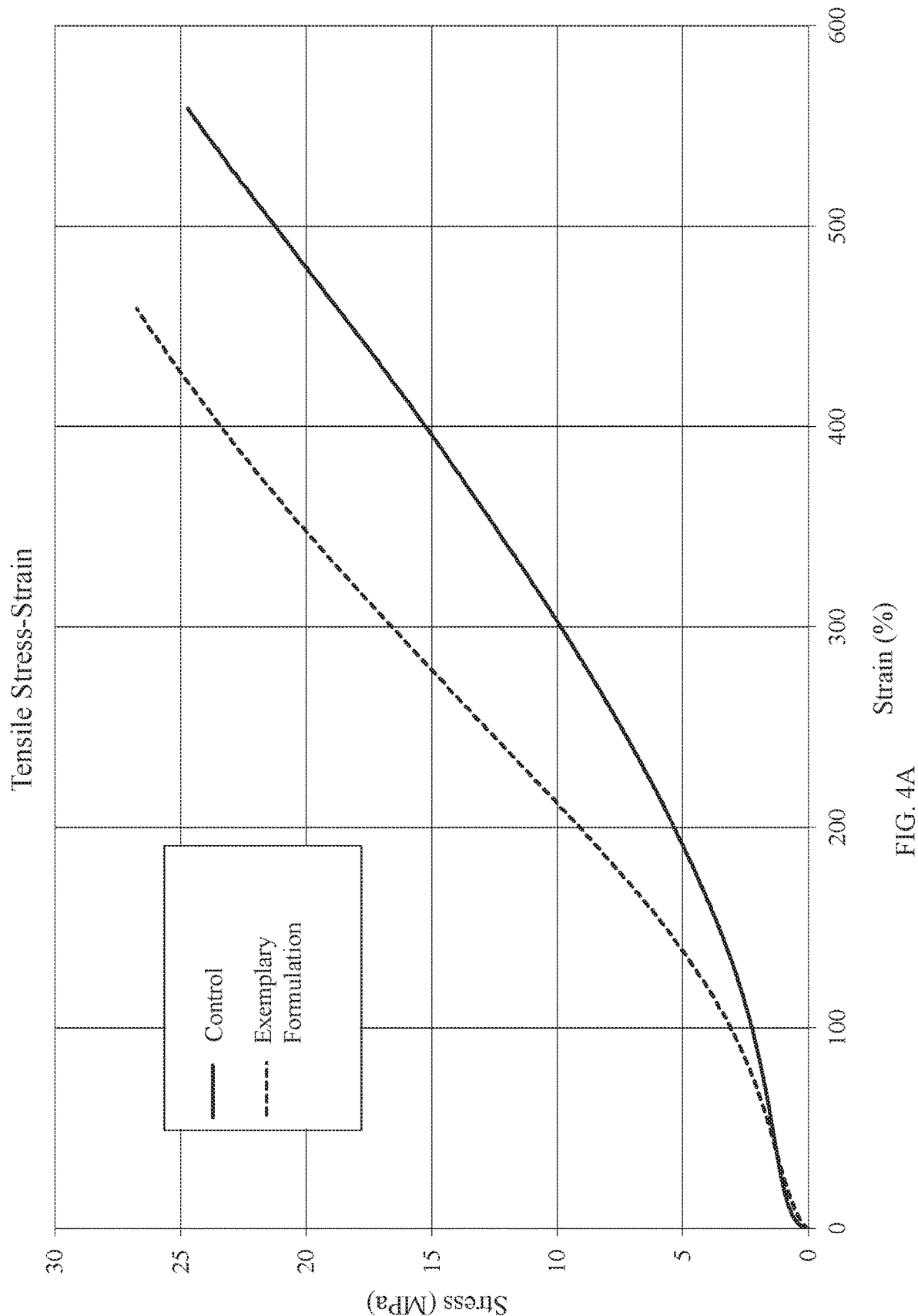
FIG. 4A is a graph of the tensile stress strain of an exemplary composition compared to a control, according to one embodiment of the present disclosure.

Turning to FIG. 4A, a graph of the tensile stress-strain of an exemplary composition compared to a control is shown, according to one embodiment of the present disclosure. In multiple embodiments, the disclosed composition may have a higher stress than the control above a strain percentage of about 38%. In one or more embodiments, the disclosed composition may have a more linear stress-strain behavior, indicative of improved bond formations between the natural rubber latex and the silica from the silsesquioxane oligomer. In at least one embodiment, the control graphed in FIG. 2 is a natural rubber latex that is not mixed with a silsesquioxane or glucono delta-lactone (compound 1 from Example 3 below).

Figure 4B:
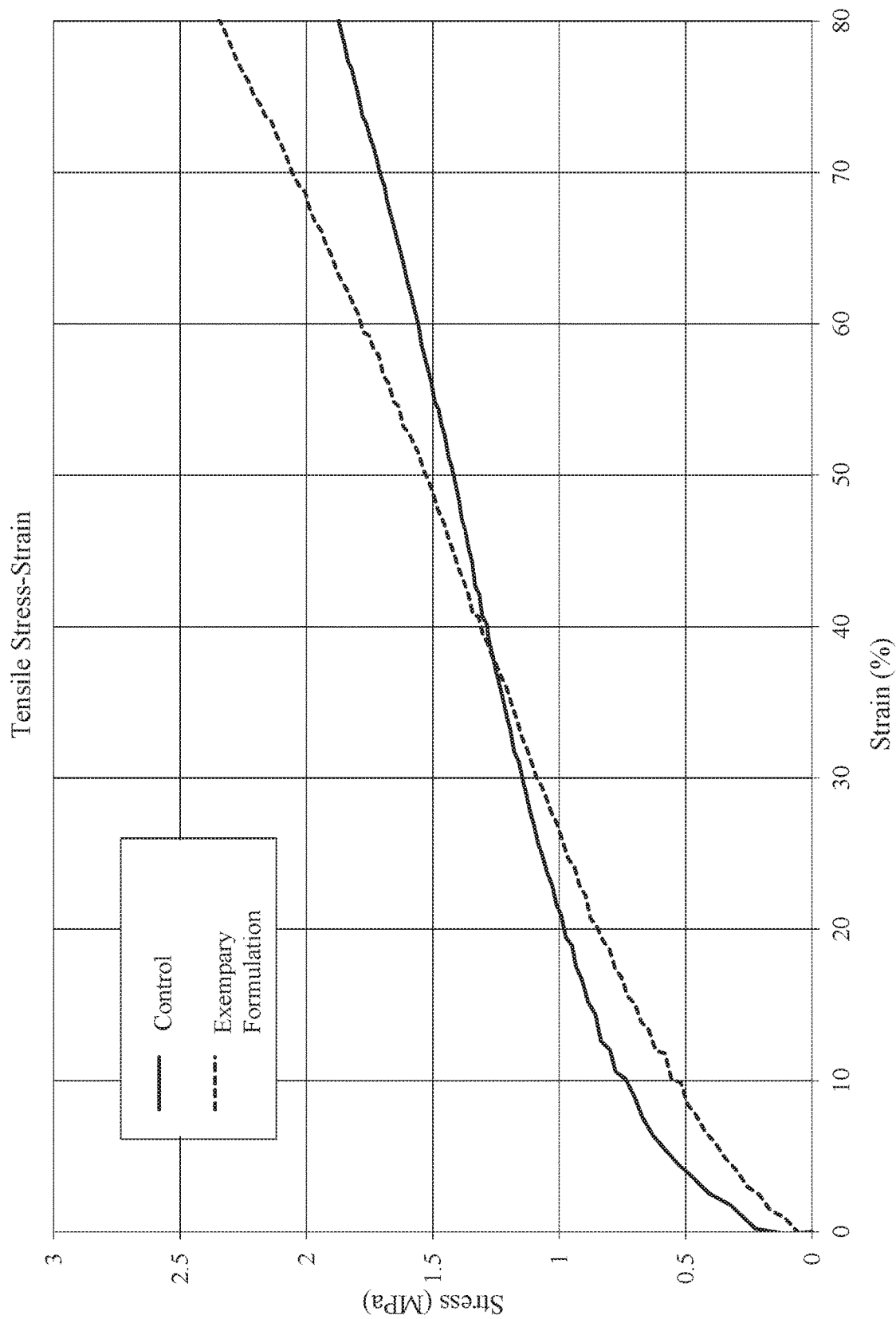
FIG. 4B is a graph of the tensile stress-strain of an exemplary composition compared to a control, according to one embodiment of the present disclosure.

Turning to FIG. 4B, the graph of FIG. 4A is shown, magnified to a specific range, is shown, according to one embodiment of the present disclosure.

Figure 5:
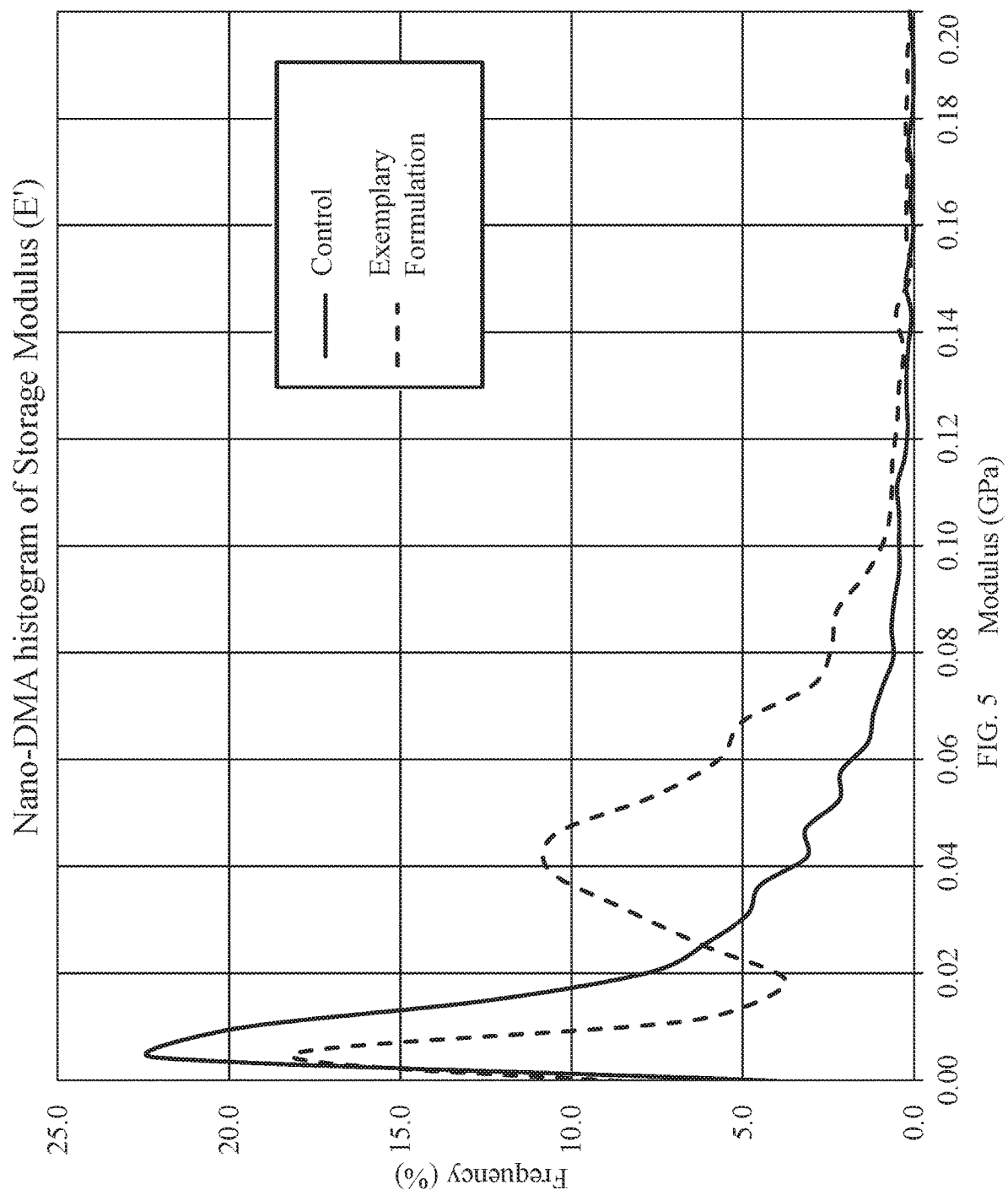
FIG. 5 is a graph of the Nano-DMA histogram of Storage Modulus of an exemplary composition compared to a control, according to one embodiment of the present disclosure.

Turning to FIG. 5, a graph of a nano-DMA histogram of storage modulus (E') comparing a control (compound 1 from Example 3, see below) and an exemplary composition (compound 3 from Example 3, see below). In one or more embodiments, specifications of the nano-DMA histogram were as follows: the equipment used was a Bruker nano-DMA, the measure sample area was 5 micrometer×5 micrometer, the conditions were T=27° C. and frequency 100 Hz, the nano-DMA resolution was 100 nanometers, and the histogram had 512 bins ranging to 3.39 GPa.

In at least one embodiment, the image shows a unique bi-modal E' histogram of the exemplary composition with a first peak at about 0.01 GPa and a characteristic secondary peak at 0.04 GPa with a breadth of 0.02 to 0.10 GPa.

Figure 6:
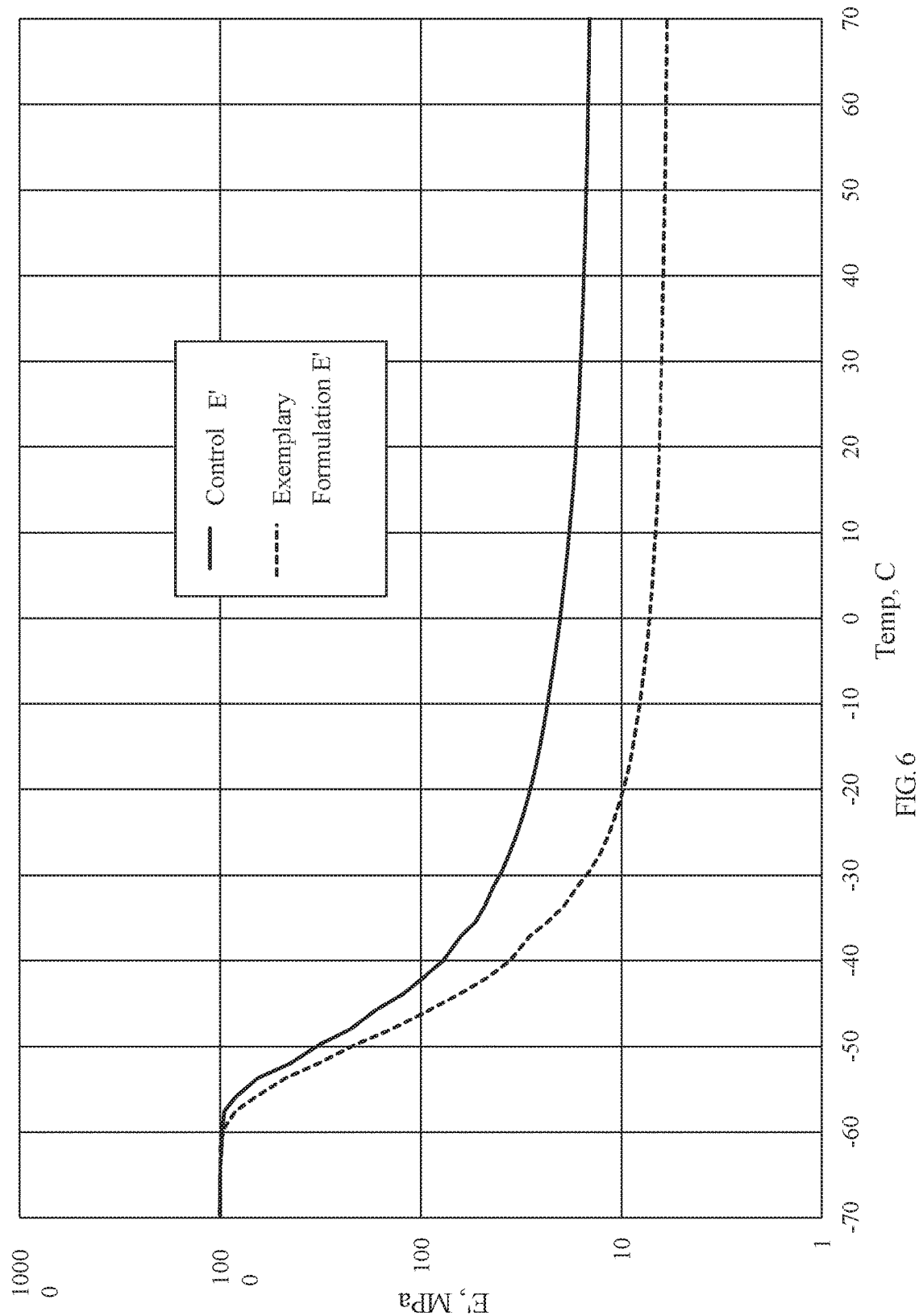
FIG. 6 is a graph of the DMA E' of an exemplary composition compared to a control, according to one embodiment of the present disclosure.

Turning to FIG. 6, a graph of the DMA E' of an exemplary composition compared to a control is shown, according to one embodiment of the present disclosure. In at least one embodiment, the control graphed in FIG. 2 is a natural rubber latex that is not mixed with a silsesquioxane or glucono delta-lactone (compound 1 from Example 3 below).

Figure 7:
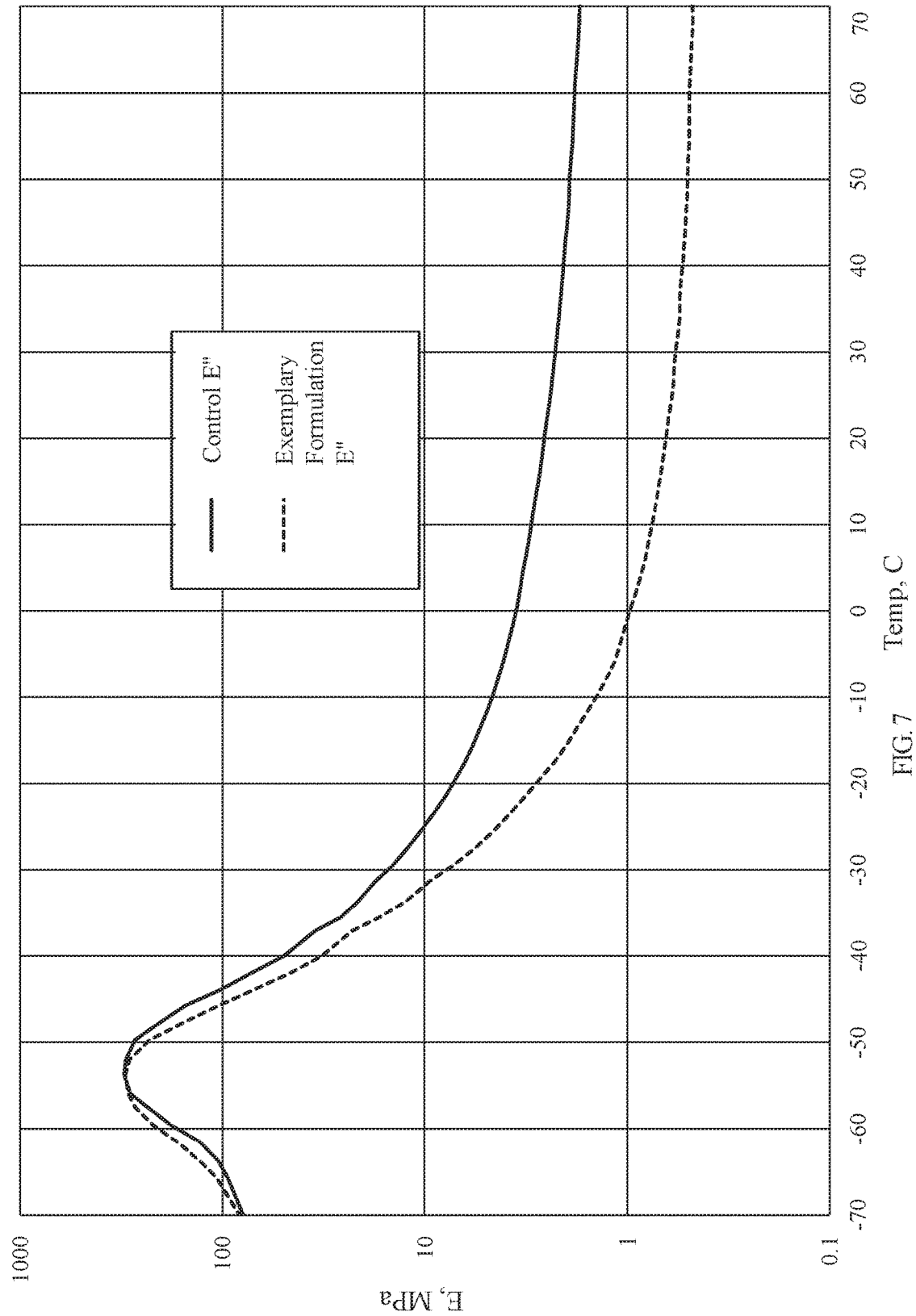
FIG. 7 is a graph of the DMA E" of an exemplary composition compared to a control, according to one embodiment.

Turning to FIG. 7, a graph of the DMA E" of an exemplary composition compared to a control is shown, according to one embodiment of the present disclosure. In at least one embodiment, the control graphed in FIG. 2 is a natural rubber latex that is not mixed with a silsesquioxane or glucono delta-lactone (compound 1 from Example 3 below).

EXAMPLES

The following examples illustrate certain embodiments of the present disclosure, as well as test results relating to the same. These examples are provided for illustrative purposes only, and are not intended to be limiting as to the scope of the inventions described in this disclosure. Instead, these examples provide useful guidance as to certain elements, ratios, and test results of various and specific embodiments of the present disclosure.

Example 1

According to one embodiment, a stable natural rubber latex/SSQ oligomer may be realized and the resulting composition could have useful properties. In various embodiments, the disclosed composition may be formulated via the following steps: 1) add distilled water to a natural rubber latex, 2) add glucono delta-lactone (GDL), 3) stir for a period of time 4) add aminoalkylsilsesquioxane oligomer in aqueous solution, 5) stir for a period of time, 6) wait for a period of time for the resulting mixture to acidify to a desired pH level, 7) dewater the mixture and press at a specific temperature.

For example, in one embodiment, the formulation may include:

1. Provide approximately 40 grams ammonia-stabilized, centrifuge-concentrated 62% natural rubber latex, pH 10.5.
2. Add approximately 100 grams distilled water.
3. Add approximately 4 grams glucono delta-lactone (GDL).
4. Stir the above solution for approximately 30 seconds (using a low-shear magnetic stir bar).
5. Add approximately 10 grams aminopropyl/methylsilsesquioxane oligomer 20% in aqueous solution, pH 11.
6. Stir the above solution for approximately 60 seconds.
7. Wait approximately two hours for acidification to pH 6-6.5.
8. Remove gel from the serum, press dewater, and dry at approximately 70° C.

As observed in the above experiment, the GDL gradually hydrolyzes and acidifies to reduce the pH of the natural rubber latex and induce coagulation of the natural rubber latex. In certain test scenarios, adding the GDL before the oligomer addition temporarily improved the latex/oligomer stability and enabled higher oligomer concentrations. In at least one embodiment, tests on the resulting composition included TGA, which indicated approximately 5% silica content, and DMA analysis, which indicated a shift in glass transition temperature (Tg) from −63 degrees C. to −60° C. In the above example, the Tg shows a significant reinforcement effect at relatively low silica loadings, and an efficient reinforcement indicative of a molecular composite. The Tg shift is a positive indicator for the improved wet traction—rolling resistance parameter balance needed for increased utilization of natural rubber in LRR tread compounds. In at least one embodiment, SEM/EDX silicon mapping indicated that silica was distributed throughout the sample, with no indication of silica agglomerates.

Example 2

In several embodiments, a scaled-up process for the formation of the disclosed composition is described, and the steps of the process is generally the same as the above example. For example, in one embodiment, the formulation may include:

1. Provide approximately 330.4 grams 62% natural rubber latex.
2. Add approximately 800 grams distilled water
3. Add approximately 32 grams GDL
4. Stir the above solution for approximately 30 second using a magnetic bar stir
5. Add approximately 85 grams aminopropyl/methyl-silsesquioxane oligomer
6. Stir the above solution for approximately 60 seconds using a magnetic bar stir
7. End solution of approximately 1285.4 grams
8. Wait approximately 6 hours for acidification to an approximate pH 5.0
9. Remove gel from the serum, press dewater, and dry for approximately 72 hours at approximately 122° F.

In the above example, the natural rubber latex may coagulate to serum and gel after 6 hours of acidification to a final pH 5.0. In at least one test case, 204 grams loose serum dried to 37 grams serum solids. In this example, the gel was wet-pressed to 595 grams and dried 72 hours at 122° F. to 245 grams.

Example 3

In the present example, a process for forming the disclosed composition is described, but the addition of the distilled water is eliminated, which suppresses the gel-serum separation and retains substantially all of the oligomer in the NR, as confirmed by TGA. In this example, the latex-oligomer blends are poured into pans and dried with no gel-serum separation. In the below table, AP-V refers to aminopropylsilsesquioxane-vinylsilsesquioxane (for example, Gelest WSA-6501), and AP-M refers to aminopropylsilsesquioxane-methylsilsesquioxane (for example, Gelest WSA-7011). For example, the results of six samples are shown in the below tables.

In the present example, the process for the samples are as follows: 1) add glucono delta-lactone to approximately a 20% silsesquioxane oligomer solution, 2) mix for a period of time, 3) add defoamer (for example, BYK-1740) to 62% natural rubber latex, 4) low shear mix the natural rubber latex and defoamer for a period of time, 5) low shear mix the natural rubber latex mixture from step 4 and oligomer solution mixture from step 2 for a period of time, 6) add glutaraldehyde to the resulting mixture from step 5, 7) low shear mix the glutaraldehyde and natural rubber/oligomer mixture, and 8) dry the resulting mixture from step 7 for a period of time at a specific temperature.

The results of the above-described formation process for this example are shown in Table 1 below.

TABLE 1

Results of formation process

| | 1 | 2 | 3 | 4 | 5 | 6 |
|---|---|---|---|---|---|---|
| Silsesquioxane oligomer type | n/a | AP-V | AP-V | AP-M | AP-M | AP-V |
| 20% oligomer solution, g | 0 | 504 | 457 | 486 | 486 | 835 |
| Glucono delta-lactone, g | 0 | 86 | 86 | 86 | 0 | 86 |
| Pre-mix GDL & oligomer, s | n/a | 600 | 600 | 600 | n/a | 600 |
| 62% Latex, g | 1680 | 1440 | 1440 | 1440 | 1440 | 1440 |
| Dry Rubber Content (DRC), g | 1064 | 912 | 912 | 912 | 912 | 912 |
| Defoamer BYK-1740, g | 0 | 10 | 0 | 10 | 10 | 10 |
| Low shear mix 1740 & latex, s | n/a | 30 | n/a | 30 | 30 | 30 |
| Low shear mix latex and oligomer, s | 30 | 300 | 300 | 300 | 300 | 300 |
| glutaraldehyde 2%, g | 0 | 144 | 0 | 137 | 137 | 234 |
| Low shear mix, s | 0 | 600 | 600 | 600 | 600 | 600 |
| Dry temp, C. | 50 | 50 | 50 | 50 | 50 | 50 |
| Dry time, h | 48 | 48 | 48 | 48 | 48 | 48 |
| Total solids | 1064 | 1102 | 1003 | 1098 | 1012 | 1170 |
| Oligomer, g | 0 | 101 | 91 | 97 | 97 | 167 |
| Equivalent SiO$_2$, g | 0 | 52 | 48 | 52 | 52 | 87 |
| Equivalent SiO$_2$, % | 0.0% | 5.0% | 4.5% | 5.0% | 5.4% | 8.0% |

In the present example, the resulting compositions from Table 1 were further mixed to create a rubber compound. The resulting compositions from Table 1 were processed in a first pass as follows: 1) set a mixer to approximately 55 rotations per minute (RPMs), 2) add the resulting composition (Polymer Composition) to the mixer for approximately a 30 second mastication while ramming down, 3) ram up and add other ingredients of the first pass, then ram down, 4) sweep at approximately 200° F. and dump at approximately 300° F. In one or more embodiments, the terms "ramming down", "ram up", "sweep", and "dump" have the standard meanings as one having ordinary skill in the art of rubber manufacturing would understand.

In this example, the resulting compounds from the first pass were processed in a final pass the next day. The steps of the final pass are as follows: 1) set a mixer to approximately 45 RPMs, 2) add approximately half of the resulting compounds from the first pass to the mixer, 3) add a cure package of compounds listed in the final pass section of Table 2, 4) add the rest of the resulting compounds from the first pass, 5) sweep at approximately 170° F. and dump at approximately 200° F.

The compound recipe from these examples is shown in Table 2 below.

TABLE 2

Compound Recipe

| | 1 | 2 | 3 | 4 | 5 | 6 |
|---|---|---|---|---|---|---|
| First Pass | | | | | | |
| Resulting Composition | 80.0 | 89 | 89 | 89 | 89 | 92 |
| Europrene Noecis BR40 | 20 | 20 | 20 | 20 | 20 | 20 |
| N234 Carbon Black | 5 | 5 | 5 | 5 | 5 | 5 |
| P200MP Silica | 45 | 40.6 | 40.6 | 40.6 | 40.6 | 37.6 |
| Si69 TESPT | 6.4 | 5.8 | 5.8 | 5.8 | 5.8 | 5.4 |
| Extensoil 1996 | 10 | 10 | 10 | 10 | 10 | 10 |

TABLE 2-continued

| Compound Recipe | | | | | | |
|---|---|---|---|---|---|---|
| | 1 | 2 | 3 | 4 | 5 | 6 |
| Zinc Oxide | 4 | 4 | 4 | 4 | 4 | 4 |
| Stearic Acid | 1 | 1 | 1 | 1 | 1 | 1 |
| 6PPD | 3 | 3 | 3 | 3 | 3 | 3 |
| 2,2,4-Trimethyl-1,2-Dihydroquinoline (TMQ) | 1 | 1 | 1 | 1 | 1 | 1 |
| Struktol 40MS | 1.5 | 1.5 | 1.5 | 1.5 | 1.5 | 1.5 |
| Final Pass | | | | | | |
| Sulfur | 1.5 | 1.5 | 1.5 | 1.5 | 1.5 | 1.5 |
| N-cyclohexylbenzothiazole-2-sulphenamide (CBS) | 2 | 2 | 2 | 2 | 2 | 2 |
| 1,3-Diphenylguanidine (DPG) | 0.9 | 0.9 | 0.9 | 0.9 | 0.9 | 0.9 |
| Total | 181.3 | 185.3 | 185.3 | 185.3 | 185.3 | 194.9 |

In the present example, the resulting compounds from the final pass were tested, and the results of these tests are shown in Table 3.

TABLE 3

Testing results for compounds after Final Pass

| Feature | 1 Control | 2 AP-V-G | 3 No Glut | 4 Methyl | 5 No GDL | 6 Hi level |
|---|---|---|---|---|---|---|
| Yield | 96.7 | 96.3 | 96.9 | 96 | 96.4 | 95.9 |
| TGA Ash, % | 26.9 | 25.3 | 25.5 | 25.7 | 26.0 | 26.0 |
| TGA Derivative Peak 200-250 C. | no | yes | yes | yes | no | yes |
| Payne G'10/G'1 | 0.45 | 0.74 | 0.76 | 0.78 | 0.79 | 0.71 |
| Dispersion | 93.5 | 96.1 | 94.8 | 93.8 | 93.7 | 94.8 |
| Bound Rubber, % | 50.2 | 61.9 | 65.2 | 62.7 | 71.6 | 70.7 |
| Hardness, Shore A | 67.2 | 65.4 | 64 | 64.2 | 45.1 | 52.3 |
| Tensile Strength, MPa | 23.8 | 25.29 | 26.62 | 23.71 | 15.19 | 18.14 |
| Tensile Elongation, % | 559 | 435 | 459 | 412 | 586 | 557 |
| Tensile M300, MPa | 9.9 | 16.1 | 16.3 | 16.5 | 4.42 | 7.54 |
| Abrasion loss, g | 0.097 | 0.081 | 0.082 | 0.094 | 0.134 | 0.153 |
| DMA tan-δ 60 C. | 0.125 | 0.092 | 0.082 | 0.086 | 0.173 | 0.177 |
| DMA tan-δ 60 C. | 0.175 | 0.149 | 0.134 | 0.131 | 0.169 | 0.178 |
| DMA tan-δ 0:60 ratio | 1.40 | 1.62 | 1.63 | 1.52 | 0.98 | 1.01 |
| DMA E' −20 C., MPa | 29.5 | 12.2 | 10.2 | 11.5 | 1.31 | 12.1 |

Example 4

In this present Example 4, a formulation was prepared identical to Example 3 composite formula 3, with the following exception: after the silsesquioxane oligomer/GDL mixture was added to the natural rubber latex, an addition of Solvay Z1165MP precipitated silica powder was made directly to the latex/silsesquioxane oligomer/GDL blend after approximately 10 minutes of mixing. In this example, the mixture coagulated immediately upon silica addition. The mixture was then transferred to a pan and dried approximately 48 hours at approximately 60 degrees C. In this example, the addition of the silica was equivalent to approximately 20% of the total batch solids content.

Following drying, three strips were cut from the dried mixture and elongated approximately 300%. In this example, the strips broke after 3, 5, and 6 elongations. During the elongation, loose silica was observed to fall out of the strip. In this example, the silica weight loss was equal to approximately 5% of the total weight of the strip, and equivalent to approximately 25% of the weight of the added silica.

Example 5

In this present Example 5, a formulation was prepared identical to Example 3 composite formula 3, with the following exception: before the silsesquioxane oligomer/GDL mixture was added to the latex, an addition of Solvay Z1165MP precipitated silica powder was made directly to the silsesquioxane oligomer/GDL blend after approximately 10 minutes of mixing, which formed a paste. Distilled water was added to form a slurry and the resulting slurry was mixed for approximately an additional 5 minutes at 300 rpm using a Cowles blade mixer. The slurry mixture was then added to the latex and mixed for approximately 15 minutes according to the method of Example 3 composite formula 3. In this example, the mixture was poured into a pan and dried approximately 48 hours at approximately 60 degrees C. In this example, the addition of the silica was equivalent to approximately 20% of the total batch solids content.

Following drying, three strips were cut from the dried mixture and elongated approximately 300%. In this example, none of the strips broke after 50 elongations. During the elongation, loose silica was observed to fall out of the strip. In this example, the silica weight loss was equal to approximately 1.7% of the total weight of the strip, and equivalent to approximately 8% of the weight of the added silica.

While various aspects have been described in the context of a preferred embodiment, additional aspects, features, and methodologies of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

The embodiments were chosen and described in order to explain the principles of the claimed systems and processes and their practical application so as to enable others skilled in the art to utilize the systems and processes and various embodiments and with various modifications as are suited to the particular use contemplated. Alternative embodiments will become apparent to those skilled in the art to which the claimed systems and processes pertain without departing from their spirit and scope. Accordingly, the scope of the claimed systems and processes is defined by the appended claims rather than the foregoing description and the exemplary embodiments described therein.

What is claimed is:

1. A natural rubber composition comprising natural rubber and an aminoalkylsilsesquioxane polymer, wherein the aminoalkylsilsesquioxane polymer is formed from a chemical reaction including an aminoalkylsilsesquioxane oligomer (i) having three, four, five, six, or seven silicon atoms and (ii) comprising an aminopropylsilsesquioxane-vinylsilsesquioxane copolymer oligomer.

2. The natural rubber composition of claim 1, wherein the aminopropylsilsesquioxane-vinylsilsesquioxane copolymer oligomer has a ratio of aminopropylsilsesquioxane repeat units to vinylsilsesquioxane repeat units within the range of 3:2 to 6:1.

3. The natural rubber composition of claim 1, wherein the aminoalkylsilsesquioxane oligomer has an average molecular weight in the range of about 330 to about 552.

4. A natural rubber composition comprising natural rubber and an aminoalkylsilsesquioxane polymer, wherein the aminoalkylsilsesquioxane polymer is formed from a chemical reaction including an aminoalkylsilsesquioxane oligomer having three, four, five, six, or seven silicon atoms and the aminoalkylsilsesquioxane oligomer comprises an aminopropylsilsesquioxane-methylsilsesquioxane copolymer oligomer.

5. The natural rubber composition of claim 4, wherein the aminopropylsilsesquioxane-methylsilsesquioxane copolymer oligomer comprises three to five aminopropyl groups and one to two methylpropyl groups.

6. The natural rubber composition of claim 4, wherein the aminopropylsilsesquioxane-methylsilsesquioxane copolymer oligomer has a ratio of aminopropylsilsesquioxane repeat units to methyl silsesquioxane repeat units within the range of 3:2 to 6:1.

7. A natural rubber composition comprising natural rubber and an aminoalkylsilsesquioxane polymer, wherein the aminoalkylsilsesquioxane polymer is formed from a chemical reaction including an aminoalkylsilsesquioxane oligomer having three, four, five, six, or seven silicon atoms and the aminoalkylsilsesquioxane oligomer comprises an aminoalkylsilsesquioxane homopolymer oligomer.

8. The natural rubber composition of claim 7, wherein alkyl groups of the aminoalkylsilsesquioxane homopolymer oligomer includes one, two, three, four, five, or six carbon atoms.

9. A natural rubber composition comprising natural rubber, an aminoalkylsilsesquioxane polymer, and a stabilizer, wherein the aminoalkylsilsesquioxane polymer is formed from an aqueous solution comprising aminoalkylsilsesquioxane oligomer.

10. The natural rubber composition of claim 9, further comprising precipitated silica.

11. The natural rubber composition of claim 9, wherein the stabilizer is selected from a group comprising glycols, glucono delta-lactone, gluconic acid, acid, and surfactants.

12. The natural rubber composition of claim 9, wherein the aminoalkylsilsesquioxane oligomer comprises aminopropylsilsesqui-oxane-vinylsilsesquioxane copolymer oligomer.

13. The natural rubber composition of claim 9, wherein the aminoalkylsilsesquioxane oligomer comprises aminopropylsilsesquioxane-methylsilsesquioxane copolymer oligomer.

14. A natural rubber composition comprising natural rubber and an aminoalkylsilsesquioxane polymer, wherein the aminoalkylsilsesquioxane polymer is formed from a chemical reaction including an aminoalkylsilsesquioxane oligomer having three, four, five, six, or seven silicon atoms and the aminoalkylsilsesquioxane oligomer has an average molecular weight in the range of about 330 to about 552.

* * * * *